(12) United States Patent
Naderzad et al.

(10) Patent No.: US 12,385,291 B2
(45) Date of Patent: Aug. 12, 2025

(54) ADJUSTABLE SECURITY BRACKET FOR LAPTOP COMPUTERS

(71) Applicant: OnQ Solutions, Inc., Hayward, CA (US)

(72) Inventors: Sean A. Naderzad, San Jose, CA (US); Steven D. Penny, Oakland, CA (US); Curtis Acosta, San Jose, CA (US)

(73) Assignee: OnQ Solutions, Inc., Hayward, CA (US)

( * ) Notice: Subject to any disclaimer, the term of this patent is extended or adjusted under 35 U.S.C. 154(b) by 175 days.

(21) Appl. No.: 18/303,827

(22) Filed: Apr. 20, 2023

(65) Prior Publication Data

US 2024/0328211 A1    Oct. 3, 2024

Related U.S. Application Data

(60) Provisional application No. 63/492,749, filed on Mar. 28, 2023.

(51) Int. Cl.
*E05B 73/00* (2006.01)
*F16M 13/02* (2006.01)

(52) U.S. Cl.
CPC ......... *E05B 73/0082* (2013.01); *F16M 13/02* (2013.01)

(58) Field of Classification Search
CPC .. E05B 73/0082; E05B 73/00; E05B 47/0004; E05B 2047/0016; F16M 13/02; Y10T 70/5009

(Continued)

(56) References Cited

U.S. PATENT DOCUMENTS 5,168,601 A    12/1992    Liu
5,673,628 A    10/1997    Boos
(Continued)

FOREIGN PATENT DOCUMENTS

WO    WO2019/213490 A1    11/2019

OTHER PUBLICATIONS

Non-final Office Action dated Jul. 25, 2023, U.S. Appl. No. 17/887,692, filed Aug. 15, 2022.
(Continued)

*Primary Examiner* — Suzanne L Barrett
(74) *Attorney, Agent, or Firm* — Pearl Cohen Zedek Latzer Baratz LLP

(57) ABSTRACT

Apparatuses for physically securing a laptop in an open position to a display surface are disclosed. Such an apparatus comprises a main body from which fastener(s) extend downward, and left and right arms that are extendable and retractable relative to the main body. The left and right arms comprise, respectively, left and right braces. A tab extends through an opening in a bottom of the main body and is configured to transition the apparatus from a unidirectional configuration to a bidirectional configuration in response to being pressed. When the apparatus is in the unidirectional configuration the left and right arms are retractable in tandem relative to the main body, and the left and right arms are prevented from being extended relative to the main body. When the apparatus is in the bidirectional configuration the left and right arms are both retractable and extendable relative to the main body.

24 Claims, 17 Drawing Sheets

(58) Field of Classification Search
USPC .................................. 70/62, 14, 58, 225, 226
See application file for complete search history.

(56) References Cited

U.S. PATENT DOCUMENTS

| | | | |
|---|---|---|---|
| 6,220,556 | B1 | 4/2001 | Sohrt et al. |
| 6,386,413 | B1 | 5/2002 | Twyford |
| 6,700,488 | B1 | 3/2004 | Leyden et al. |
| 7,187,283 | B2 | 3/2007 | Leyden et al. |
| 7,967,269 | B2 | 6/2011 | Liu |
| 8,061,164 | B2 | 11/2011 | Johnston et al. |
| 8,191,851 | B2 | 6/2012 | Crown |
| 8,240,628 | B2 | 8/2012 | Huang |
| 8,360,373 | B2 | 1/2013 | Johnson et al. |
| 8,627,953 | B1 | 1/2014 | Yeo |
| 8,701,452 | B2 | 4/2014 | Foster et al. |
| 8,814,128 | B2 | 8/2014 | Trinh et al. |
| 8,833,716 | B2 | 9/2014 | Funk et al. |
| 8,864,089 | B2 | 10/2014 | Hung |
| 8,925,886 | B2 | 1/2015 | Sears |
| 8,985,544 | B1 | 3/2015 | Gulick, Jr. |
| 8,998,048 | B1 | 4/2015 | Wu |
| 9,022,337 | B2 | 5/2015 | Petruskavich |
| 9,039,785 | B2 | 5/2015 | Gulick, Jr. |
| 9,097,380 | B2 | 8/2015 | Wheeler |
| 9,117,351 | B2 | 8/2015 | Gulick, Jr. et al. |
| 9,159,309 | B2 | 10/2015 | Liu et al. |
| 9,161,466 | B2 | 10/2015 | Huang |
| 9,194,532 | B2 | 11/2015 | Bisesti et al. |
| 9,568,141 | B1 | 2/2017 | Zaloom |
| 9,714,528 | B2 | 7/2017 | Van Balen |
| 9,749,002 | B1 | 8/2017 | Fan |
| 9,797,543 | B2 | 10/2017 | Lin |
| 9,936,823 | B2 | 4/2018 | Galant |
| 9,955,598 | B1 | 4/2018 | Wen et al. |
| 10,165,873 | B2 | 1/2019 | Gulick, Jr. et al. |
| 10,323,440 | B1 | 6/2019 | Kelsch et al. |
| 10,378,248 | B1 | 8/2019 | Kelsch et al. |
| 10,448,759 | B1 | 10/2019 | Chapuis et al. |
| 10,750,885 | B2 | 8/2020 | Hyma et al. |
| 10,793,080 | B2* | 10/2020 | Zhang ................... H04B 1/082 |
| 10,858,865 | B2* | 12/2020 | Kelsch ................ E05B 73/0017 |
| 10,925,414 | B2 | 2/2021 | Gulick, Jr. |
| 11,045,019 | B2 | 6/2021 | Chapuis et al. |
| 11,122,917 | B2 | 9/2021 | Chapuis et al. |
| 11,363,895 | B2 | 6/2022 | Schuft et al. |
| 11,412,865 | B2 | 8/2022 | Chapuis et al. |
| 11,432,663 | B2 | 9/2022 | Chapuis et al. |
| 2007/0034753 | A1 | 2/2007 | Lee |
| 2009/0090839 | A1 | 4/2009 | Lin |
| 2010/0079285 | A1* | 4/2010 | Fawcett ............. E05B 73/0082 70/57.1 |
| 2010/0108828 | A1 | 5/2010 | Yu et al. |
| 2010/0148030 | A1 | 6/2010 | Lin |
| 2011/0133050 | A1 | 6/2011 | Eisenberger, Sr. |
| 2012/0037783 | A1 | 2/2012 | Alexander et al. |
| 2012/0234055 | A1 | 9/2012 | Bland, III et al. |
| 2013/0301216 | A1 | 11/2013 | Trinh et al. |
| 2013/0318639 | A1 | 11/2013 | Gulick, Jr. |
| 2014/0060218 | A1 | 3/2014 | Bisesti et al. |
| 2014/0263931 | A1 | 9/2014 | Chen |
| 2015/0060624 | A1* | 3/2015 | Huang ................. F16M 11/105 248/316.4 |
| 2015/0089675 | A1 | 3/2015 | Gulick, Jr. |
| 2015/0108948 | A1 | 4/2015 | Gulick, Jr. et al. |
| 2015/0196140 | A1 | 7/2015 | Lin |
| 2015/0300050 | A1 | 10/2015 | Van Balen |
| 2015/0313206 | A1 | 11/2015 | Yu |
| 2016/0325693 | A1 | 11/2016 | Kim |
| 2017/0009935 | A1* | 1/2017 | Theis ..................... F16M 13/02 |
| 2017/0049251 | A1 | 2/2017 | Gulick, Jr. et al. |
| 2017/0136960 | A1 | 5/2017 | Kim |
| 2017/0188724 | A1 | 7/2017 | Lin |
| 2018/0058107 | A1 | 3/2018 | Lucas et al. |
| 2018/0279805 | A1 | 10/2018 | Galant |
| 2018/0279809 | A1 | 10/2018 | Regan et al. |
| 2019/0316386 | A1 | 10/2019 | Gulick, Jr. et al. |
| 2020/0008589 | A1 | 1/2020 | Chapuis et al. |
| 2020/0107653 | A1 | 4/2020 | Leyden et al. |
| 2020/0191178 | A1 | 6/2020 | Yang |
| 2020/0217451 | A1 | 7/2020 | Pham |
| 2020/0271266 | A1 | 8/2020 | Gulick, Jr. et al. |
| 2021/0015274 | A1 | 1/2021 | Chapuis et al. |
| 2021/0018137 | A1* | 1/2021 | Chapuis ................. F16M 11/04 |
| 2021/0059437 | A1* | 3/2021 | Chapuis ................. F16M 11/04 |
| 2021/0164603 | A1 | 6/2021 | Chapuis et al. |
| 2021/0228000 | A1* | 7/2021 | Schuft ................ E05B 73/0017 |
| 2021/0307543 | A1 | 10/2021 | Chapuis et al. |
| 2021/0355714 | A1 | 11/2021 | Chapuis et al. |
| 2022/0412129 | A1* | 12/2022 | Chapuis ................. F16M 13/02 |
| 2023/0407683 | A1* | 12/2023 | Penny ................ E05B 73/0017 |

OTHER PUBLICATIONS

GRIPZO, "iPad Enclosure", https://www.gripzo.com/en/products/tablets/ipad-enclosure, downloaded on Jun. 11, 2018.
GRIPZO, "iPhone", https://www.gripzo.com/en/products/smartphones/iphone, downloaded on Jun. 11, 2018.
Scorpion Security Products, "4-Point ERS Phone Scorpion", https://www.scorpionsecurityproducts.com/product/4-point-ers-phone-scorpion/, downloaded on Jun. 11, 2018.
Scorpion Security Products, "4-Point ERS Small Tablet Scorpion", https://www.scorpionsecurityproducts.com/product/4-point-ers-small-tablet-scorpion/, downloaded on Jun. 11, 2018.
Dongguan Comer Electronic Technology Co., Ltd., "Comer Anti-Theft Locking Laptop Mechanical Security Display Frame For Mobile Phone Stores", http://www.comerdisplay.com/sale-8024631-comer-anti-theft-locking-laptop-mechanical-security-display-frame-for-mobile-phone-stores.html, downloaded on Jun. 11, 2018.
Dongguan Comer Electronic Technology Co., Ltd., "Comer Universal Display Mechanical Anti-Theft Security Display Locking System For Tablet Brackets", http://www.smartcomer.com/sale-8028445-comer-universal-display-mechanical-anti-theft-security-display-locking-system-for-tablet-brackets.html, downloaded on Jun. 11, 2018.
RTF, "Vise- Securely And Attractively Placing Your Product First", http://www.rtfglobal.com/products/vise-cell-phone-security/, downloaded on Jun. 11, 2018.
RTF, "Smartphones—Samsung Note 3, LG Flex, HTC One, Apple iPhone 5, Blackberry Z10", http://www.rtfglobal.com/solutions/by-devices-type/smartphones/#!prettyPhoto, downloaded on Jun. 11, 2018.
GRIPZO, "Universal Smartphone Grip/ Universal Tablet Grip", https://www.gripzo.com/en/products/smartphones/iphone, downloaded on Jun. 14, 2018.
Non-final Office Action dated Nov. 24, 2023, U.S. Appl. No. 17/887,698, filed Aug. 15, 2022.
Response to Office Action dated Oct. 20, 2023, U.S. Appl. No. 17/887,692, filed Aug. 15, 2022.

* cited by examiner

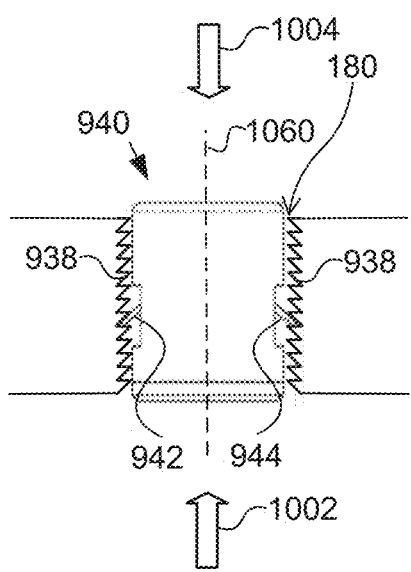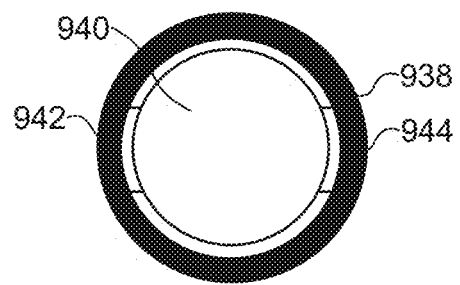
FIG. 10A　　　FIG. 10B

ADJUSTABLE SECURITY BRACKET FOR LAPTOP COMPUTERS

PRIORITY CLAIM

This application claims priority to U.S. Provisional Patent Application No. 63/492,749, filed Mar. 28, 2023, which is incorporate herein by reference.

RELATED APPLICATIONS

This application is related to U.S. patent application Ser. No. 17/887,692, filed Aug. 15, 2022, titled GEARED ADJUSTABLE PHONE BRACKET, and U.S. patent application Ser. No. 17/887,698, filed Aug. 15, 2022, titled RATCHETING BUTTONS FOR SECURING ELECTRONIC DEVICES.

FIELD OF TECHNOLOGY

Embodiments of the present technology relate to apparatuses that physically secure laptops to tabletops of display tables or to other display surfaces.

BACKGROUND

Portable electronic devices, such as laptop computers, are often sold in retail stores. Laptop computers, as the term is used herein, include notebook computers, and can be referred to more succinctly as laptops. Such a laptop typically includes a lower body portion (that includes a keyboard) and an upper body portion (that includes a display screen) that are attached to one another by a hinge. The hinge allows the laptop to selectively be put in either a closed position or an open position by a person. When in the closed position, the lower and upper body portions are facing one another, and the keyboard and display screen are not viewable or accessible. When in the open position, the lower and upper body portions are at an angle relative to one another, and the keyboard and display screen are viewable and accessible.

To enable customers to view, touch, and interface with laptops in a retail store, the laptops are often displayed on a display table. The laptops, which are often costly, are often secured to the display table to prevent theft. For example, a laptop can be physically secured to a table using a cable or a laptop security bracket. Such laptop security brackets may be customized for a specific size of a specific laptop. It often takes a few weeks to a few months lead-time for a laptop security bracket manufacturer to design, build, and distribute a new customized laptop security bracket that is suitable for securing a laptop to a display table. It is typically the case that whenever a new model of a laptop is released, the size (i.e., dimensions) of the laptop is changed compared to the previous model. Accordingly, it is typically the case that whenever a new model of a laptop is released, a new customized laptop security bracket (that is suitable for securing the laptop to a display table) is not available to retail stores for at least a few weeks, and potentially up to a few months. This leads to a retail store needing to order new security brackets each time a new model of a specific laptop is released. Where a retail store sells multiple different models of laptops, each year that store may need to buy numerous new security brackets, which can be very costly and can thus significantly increase the overhead of the retail store.

SUMMARY

Embodiments of the present technology are directed to apparatuses for physically securing a laptop in an open position to a display surface, wherein the laptop includes a lower body portion including a keyboard and an upper body portion including a display screen and attached to the lower body portion by a hinge. In certain embodiments, the apparatus comprises a main body, one or more fasteners extending downward from the main body and configured to secure the main body to the display surface, left and right arms, a rotatable gear, and a gear stop. The rotatable gear includes first engagement features extending from an outer circumference of the rotatable gear, and also includes second engagement features extending from a side of the rotatable gear. The gear stop includes third engagement features facing the second engagement features of the rotatable gear. The first engagement features of the rotatable gear engage portions of the left and right arms to provide for extension and retraction of the left and right arms in tandem relative to the main body. The gear stop has a first position and a second position. When the gear stop is in the first position, the third engagement features of the gear stop are biased (e.g., by a spring) against the second engagement features of the rotatable gear, during which the rotatable gear is rotatable in one of a clockwise and counterclockwise directions that allows for retraction of the left and right arms in tandem relative to the main body, and during which the rotatable gear is prevented from being rotated in the other one of the clockwise and counterclockwise directions, thereby preventing the extension of the left and right arms. By contrast, when the gear stop is in the second position, the third engagement features of the gear stop are moved away from the second engagement features of the rotatable gear, during which the rotatable gear is rotatable in both of the clockwise and counterclockwise directions, thereby allowing for the extension of the left and right arms.

In accordance with certain embodiments, the main body of the apparatus comprises a main housing from which the left and right arms are extendable and retractable in tandem, and within which are located the rotatable gear and the gear stop. The main body also includes a base from which the one or more fasteners extend downward, and a pedestal that supports the main housing above the base at a distance above the display surface to which the apparatus is attached using the one or more fasteners.

In accordance with certain embodiments, the portions of the left and right arms that engage the rotatable gear comprise rack gears of the left and right arms. In certain such embodiments, the first engagement features of the rotatable gear comprise teeth extending from the outer circumference of the rotatable gear, wherein the teeth extending from the outer circumference of the rotatable gear are configured to intermesh with teeth of the rack gears of the left and right arms.

In accordance with certain embodiments, the second engagement features of the rotatable gear comprise right triangle teeth extending from the side of the rotatable gear, and the third engagement features of the gear stop comprise further right triangle teeth extending from the gear stop.

In accordance with certain embodiments, the apparatus also includes a spring configured to normally bias the gear stop in the first position. In certain such embodiments, the apparatus further comprises a lever configured to selectively overcome the bias of the spring and move the gear stop from the first position to the second position, wherein a portion of the lever extends through an opening in a bottom of the main body. In certain such embodiments, the portion of the lever that extends through the opening in the bottom of the main body comprises a finger release tab. The finger release tab is configured to cause the lever to pivot about a pivot point that is between the finger release tab and a portion of the lever that is attached to the gear stop. The finger release tab is inaccessible, except from an underside of the display surface, when the apparatus is attached to the display surface, thereby preventing someone from releasing the left and right arms after the left and right arms have been retracted to secure the upper body portion of the laptop to the main body and the gear stop is in the first position.

In accordance with certain embodiments, the left and right arms comprise, respectively, left and right braces configured to engage left and right sides of the upper body portion of the laptop so that the apparatus can accommodate various different widths that the laptop may have.

In accordance with certain embodiments, the apparatus further comprises one or more ratcheting buttons configured to push against a backside of the upper body portion of the laptop that is secured between the left and right braces of the left and right arms so that the apparatus can accommodate various different thicknesses that the upper body portion of the laptop may have. In certain such embodiments, each ratcheting button, of the one or more ratcheting buttons, is located in a corresponding hole in the main body or in one of the left and right arms and is configured to be movable in a first direction within the corresponding hole with a ratchet mechanism to prevent movement of the ratcheting button in a second direction opposite the first direction within the corresponding hole. Additionally, each ratcheting button, of the one or more ratcheting buttons, is configured to push against the backside of the upper body portion of the laptop that is secured between the left and right braces of the left and right arms, when moved in the first direction within the corresponding hole.

In accordance with certain embodiments of the present technology, when the gear stop is in the first position, the third engagement features of the gear stop are biased against the second engagement features of the rotatable gear, during which the apparatus is in a unidirectional configuration that allows for rotation of the rotatable gear in a single direction that allows for the retraction of the left and right arms in tandem relative to the main body, and during which the rotatable gear is prevented from being rotated in a second direction that prevents the extension of the left and right arms. By contrast, when the gear stop is in a second position, the third engagement features of the gear stop are moved away from the second engagement features of the rotatable gear, during which the apparatus is in a bidirectional configuration that allows for rotation of the rotatable gear in both of the first and second directions, thereby allowing for the extension of the left and right arms. In certain such embodiments, a tab is configured to transition the apparatus from the unidirectional configuration to the bidirectional configuration in response to the tab being pressed. In certain such embodiments, the tab is part of a lever that is configured to overcome the bias of a spring and move the gear stop from the first position to the second position in response to the tab being pressed. In certain such embodiments, that tab extends through an opening in a bottom of the main body, and the tab is inaccessible, except from an underside of the display surface, when the apparatus is attached to the display surface.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 10A-B illustrate an example of the ratcheting button engaging a ratchet surface on an inner wall of a hole.

DETAILED DESCRIPTION

Embodiments of the present technology generally relate to apparatuses that can be used to physically secure laptops to tabletops of display tables or to other display surfaces. Such a laptop, as is known in the art, includes a lower body portion and an upper body portion that are attached to one another by a hinge, wherein the lower body portion includes a keyboard, and the upper body portion includes a display screen that may or may not be a touch screen. The lower body portion may also include a touchpad or other type of pointing device that enables a cursor and/or other displayed elements to be maneuvered by a user. The hinge allows the laptop to be selectively put in either a closed position or an open position. When in the closed position, the lower and upper body portions face one another and the keyboard and display screen of the laptop are facing one another and not viewable or accessible. When in the open position, the lower and upper body portions are preferably at an obtuse angle relative to one another, and the keyboard and display screen are viewable and accessible.

The benefits, features, and advantages of the various embodiments of the present technology will become better understood with regard to the following description and accompanying drawings. The following description is presented to enable one of ordinary skill in the art to make and use embodiments of the present technology as provided within the context of a particular application and its requirements. Various modifications to the embodiments described herein will, however, be apparent to one skilled in the art, and the general principles defined herein may be applied to other embodiments. Therefore, the embodiments of the present invention are not intended to be limited to the particular embodiments shown and described herein, but are to be accorded the widest scope consistent with the principles and novel features herein disclosed.

Figure 1A:
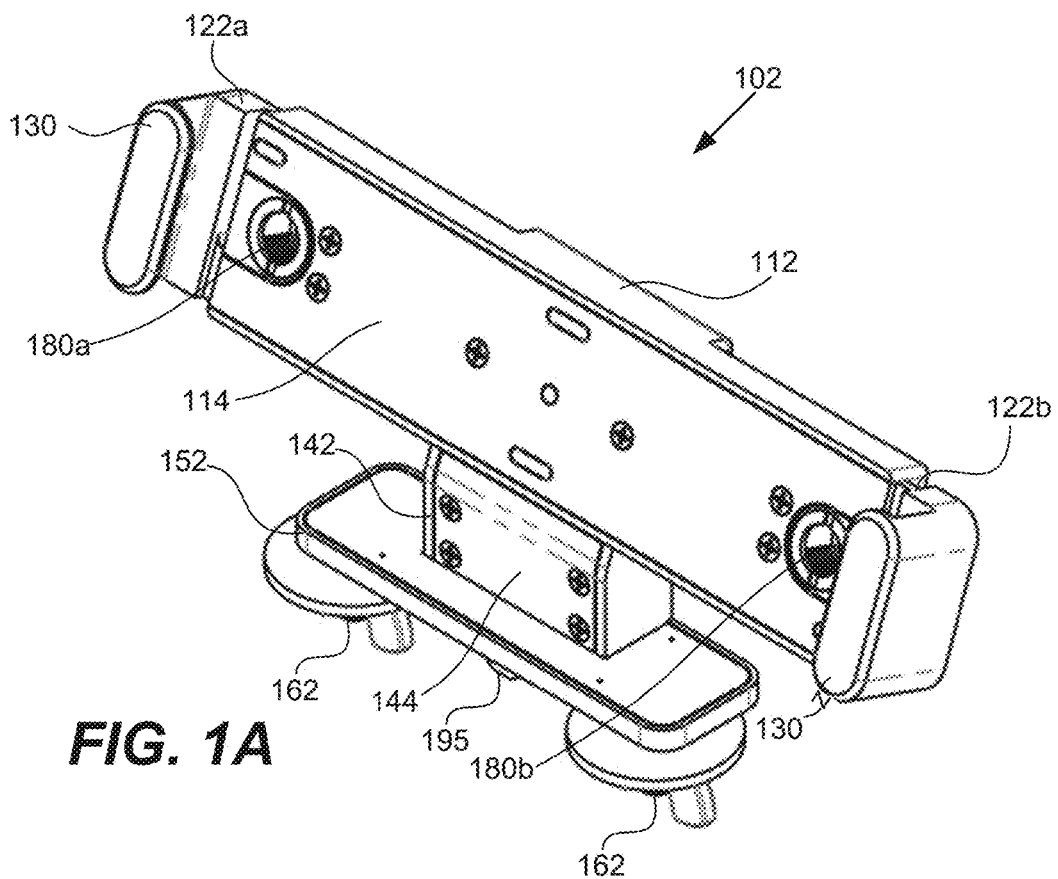
FIG. 1A is a front perspective views of an adjustable laptop security bracket, according to an embodiment of the present technology, wherein arms of the security bracket are in their fully retracted positions in FIG. 1A.
Figure 1B:
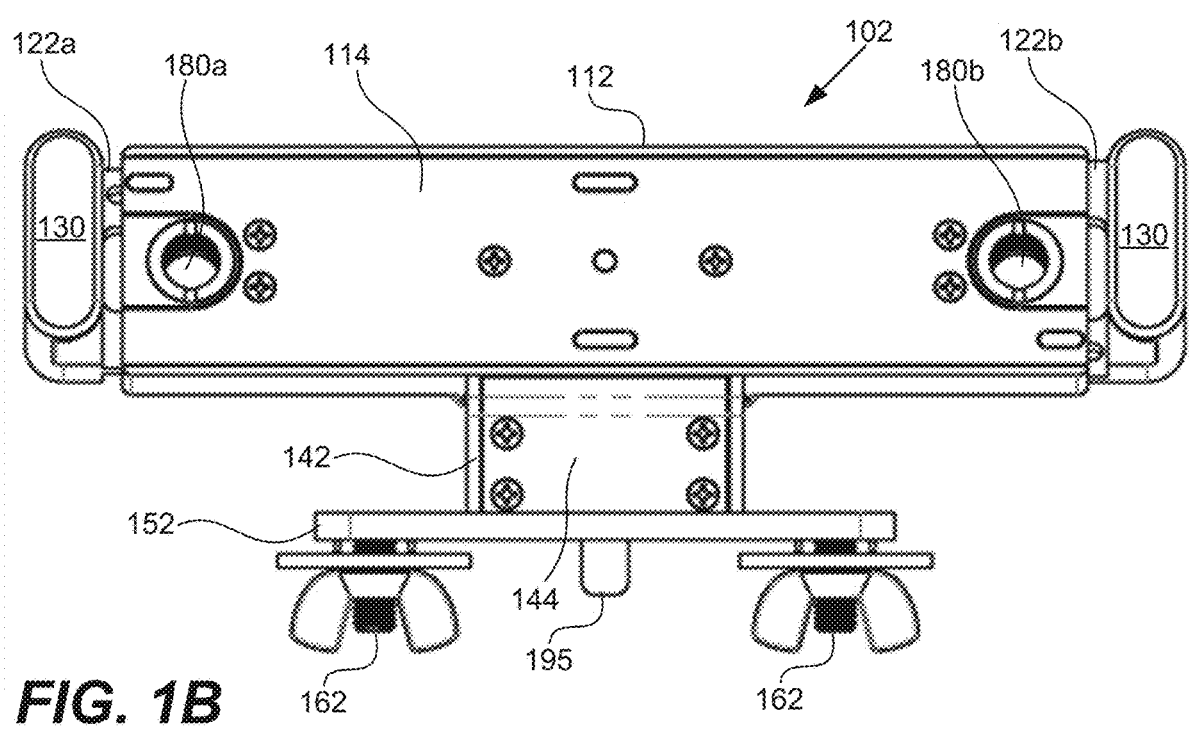
FIGS. 1B, 1C and 1D are, respectively, front, top, and side views of the adjustable laptop security bracket introduced in FIG. 1A.
Figure 1C:
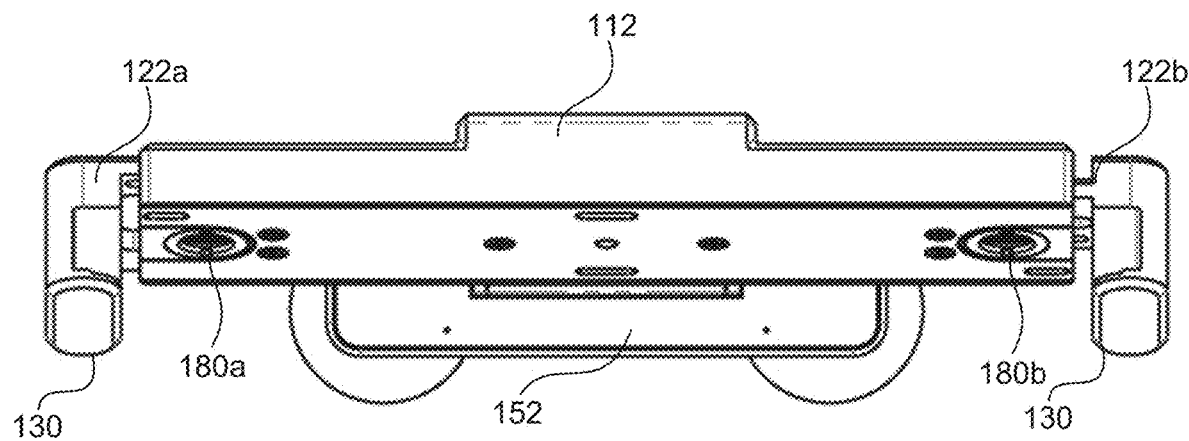
Figure 1D:
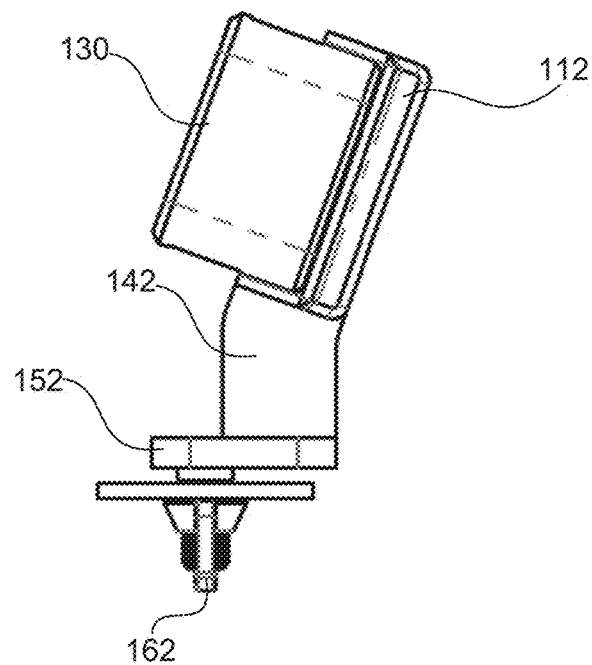
Figure 1E:
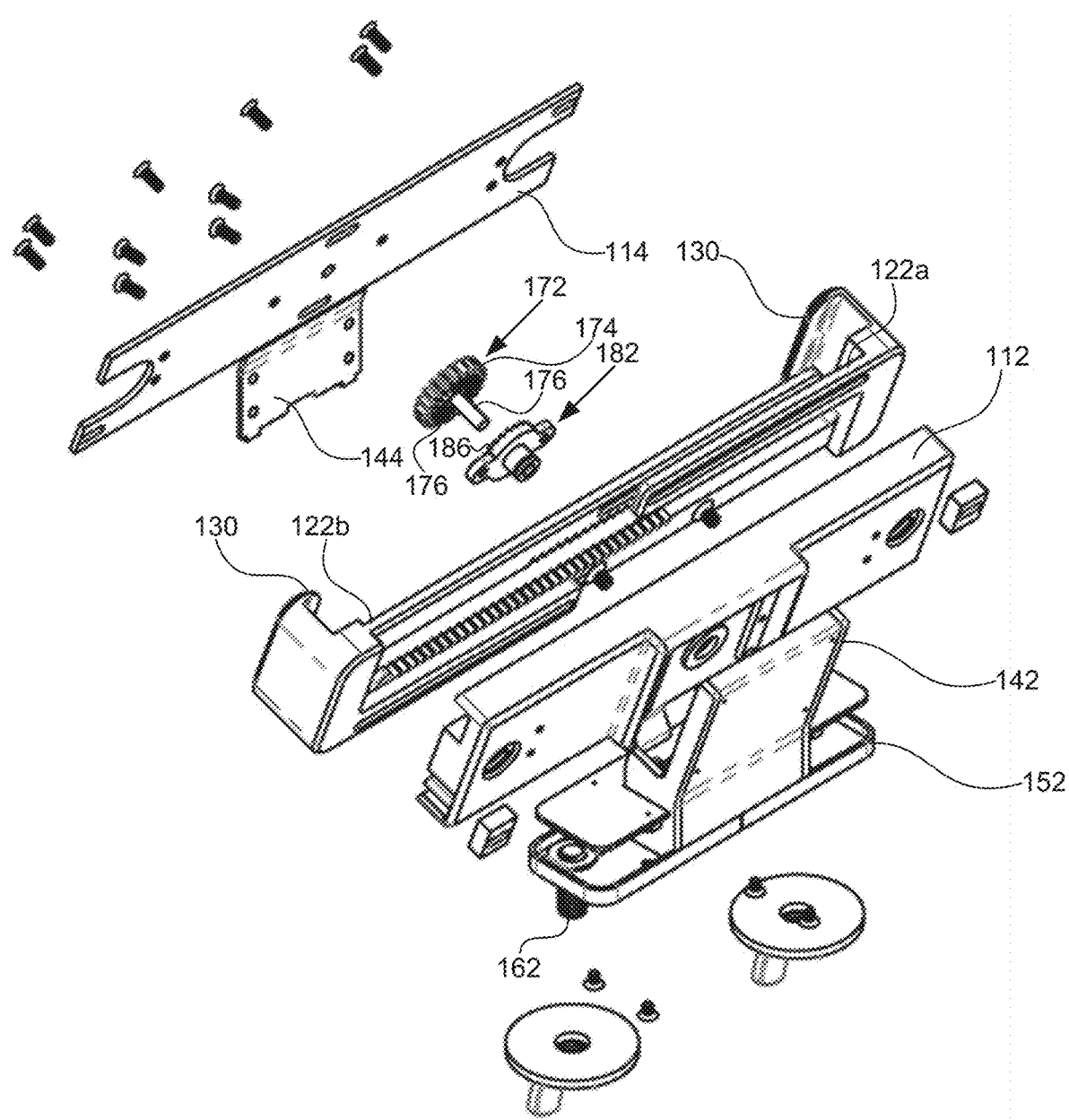
FIG. 1E is rear perspective exploded view of the adjustable laptop security bracket introduced in FIG. 1A.

FIGS. 1A, 1B, 1C and 1D are, respectively, front perspective, front, top and side views of an adjustable laptop security bracket 102, according to an embodiment of the present technology. FIG. 1E is a rear perspective exploded view of the adjustable laptop security bracket 102. The adjustable laptop security bracket 102 is also referred to herein more succinctly as a laptop security bracket 102 or an adjustable security bracket 102, and even more succinctly as a security bracket 102. The adjustable laptop security bracket can also be referred to more generally herein as an apparatus for physically securing a laptop in an open position to a display surface. The adjustable laptop security bracket 102 is shown as including a main housing 112, a left arm 122*a* that extends from a left side of the main housing 112, and a right arm 122*b* that extends from a right side of the main housing 112. The left and right arms 122*a*, 122*b* can be referred to collectively as the arms 122, or individually as an arm 122. Each of the arms 122 includes a respectively inwardly projecting brace 130, which are configured to engage and secure respective sides of an upper body portion of a laptop, which as noted above, is the portion of a laptop that includes a display screen. The braces 130 may have dimensions to accommodate a range of thicknesses of the upper body portions of laptops, which upper body portions include the display screens of the laptops.

Figure 1F:
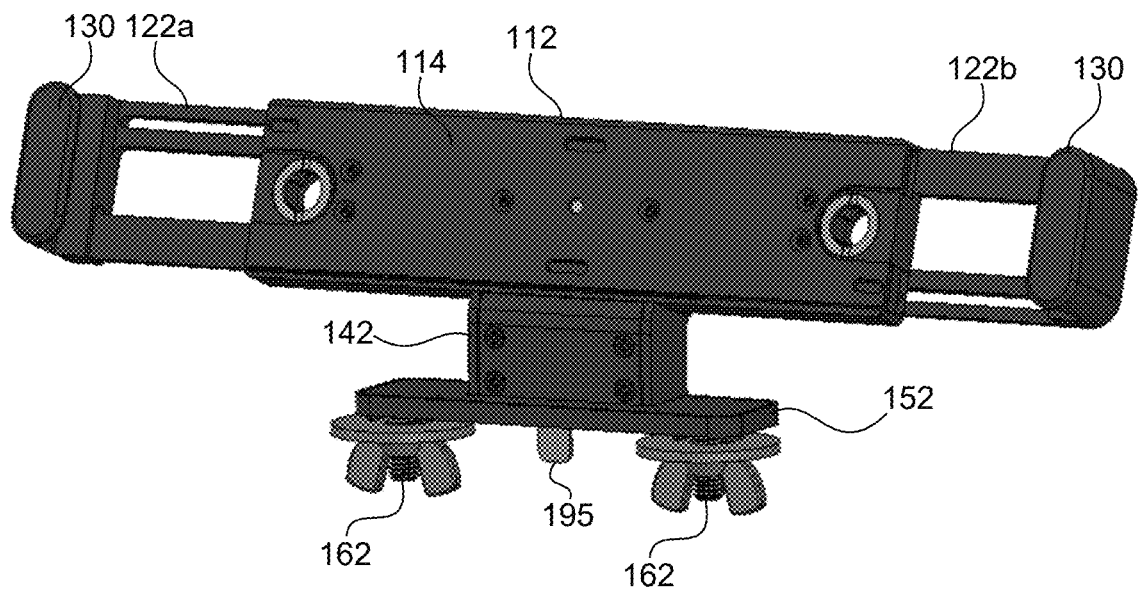
FIGS. 1F and 1G are front perspective views of the adjustable laptop security bracket introduced in FIG. 1A, with its arms partially extended, wherein in FIG. 1G portions of the adjustable laptop security bracket are removed to show some of the internal elements thereof.
Figure 1G:
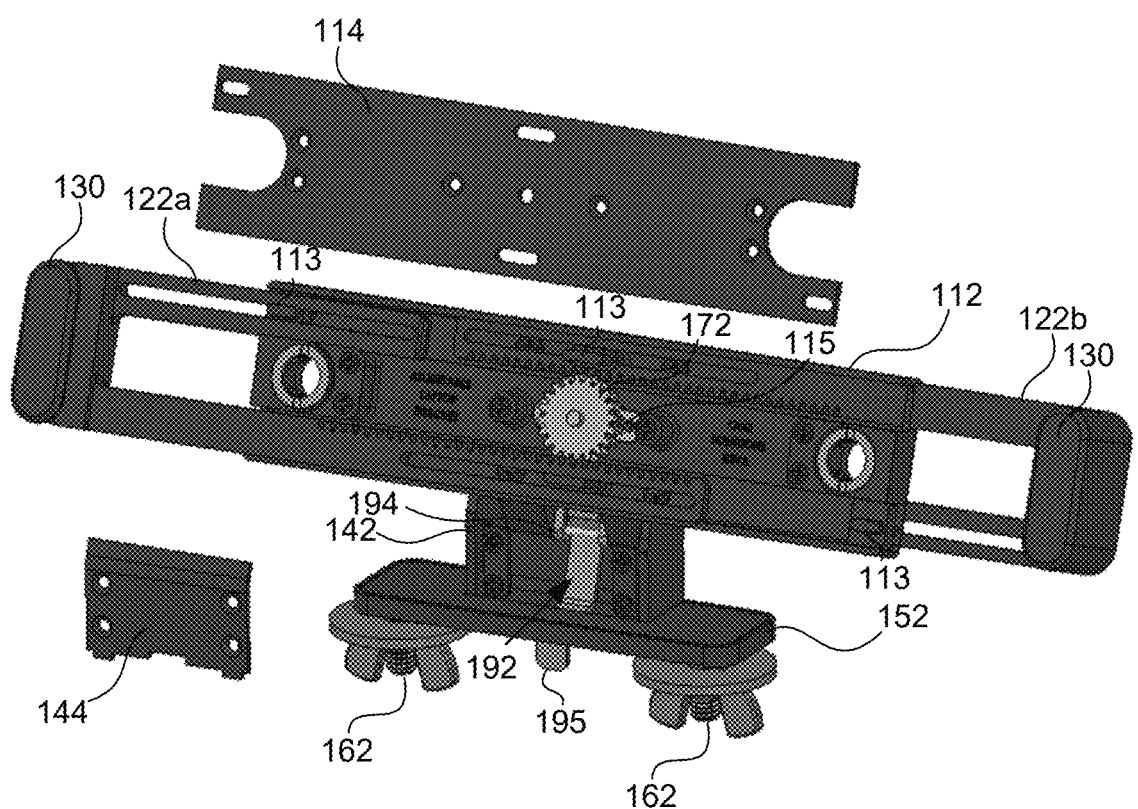

FIG. 1E is rear perspective exploded view of the adjustable laptop security bracket 102. FIGS. 1F and 1G are front perspective views of the adjustable laptop security bracket 102, with its arms 122 partially extended, wherein in FIG. 1G a front plate 114 of the main housing 112 and a front plate 144 of the pedestal 142 are removed to show some of the internal elements thereof of the security bracket 102.

As shown in FIG. 1E, the security bracket 102 includes a rotatable circular gear 172 and a gear stop 182 that are located within the main housing 112. The rotatable gear 172 can also be seen in FIG. 1G. Additional details of the rotatable gear 172 are described below with reference to FIGS. 3A-3C, and additional details of the gear stop 182 are described below with reference to FIGS. 4A-4F. As will be described in more detail below, with reference to FIGS. 6A and 6B, the gear stop 182 has a first position and a second position.

In FIGS. 1A-1E, the arms 122*a*, 122*b* are shown as being in their fully retracted positions. FIG. 1F is a front perspective view of the security bracket 102 with the arms 122*a*, 122*b* in partially extended positions. FIG. 1G is front perspective view of the security bracket 102 with the front plate 114 of the main housing 112 removed, wherein the arms 122*a*, 122*b* of the security bracket 102 are in partially extended positions. The arms 122*a*, 122*b* can be collectively referred to as the arms 122, or can be individually referred to as an arm 122.

As shown in FIGS. 1A-1G, the main housing 112 is supported by a pedestal 142, which is attached to a base 152. More specifically, the pedestal 142 supports the main housing 112 at a distance above the base 152, and thereby a distance above a support surface (e.g., tabletop or other display surface) upon which the base 152 rests and is attached thereto. Extending downward from the base 152 are fasteners 162, which can be threaded bolts, but are not limited thereto. The main housing 112, the pedestal 142 and the base 152 can be considered parts of a main body of the adjustable security bracket 102. In the embodiments shown in the drawings, the main body is made up of three discrete parts (i.e., the main housing 112, the pedestal 142 and the base 152) that are attached to one another during assembly of the adjustable security bracket 102. However, it is also possible that the main body can include more or less components, e.g., the main housing 112 and pedestal 142 can be a one component and the base 152 can be a second component, or the base 152 and the pedestal 142 can be one component, and the main housing 112 can be a second component. Other variations are also possible and within the scope of the embodiments described herein.

The fasteners 162 can be used to secure the adjustable security bracket 102 (and a laptop secured thereto) to a tabletop of a display table that includes through-holes that are appropriately located (i.e., spaced apart) so as to accept the fasteners 162 that extend downwards from the security bracket 102. The through-holes can be drilled in appropriate locations in a tabletop, or can be prearranged in a predetermined patterns of rows and columns of through-holes. Nuts (e.g., wingnuts) and/or other fastener hardware can then be used to secure the security bracket 102 (and a laptop secured thereto) to the tabletop of a display table from the underside of the tabletop. Preferably, the underside of the tabletop is made inaccessible to customers and potential thieves in a retail store, e.g., by being encased in a locked enclosure. This way potential thieves cannot remove the security bracket 102 from the display table, and thus, could not steal the laptop that is secured to the display table by the security bracket 102. In specific embodiments, the fasteners 162 are threaded PEM™ stud fasteners available from PennEngineering (headquartered in Danboro, Pennsylvania), but are not limited thereto. The length of each of the fasters can be, e.g., about 0.75 inches, but is not limited thereto.

While two fasteners 162 are shown as extending downwards from the base 152, more or less fasteners 162 can be included, i.e., one or more fasteners 162 can extend downward from the base 152. The fastener(s) 162 is/are used to secure the base 152, and more generally the security bracket 102, to a support surface, such as a tabletop. In the embodiment shown, the fasteners 162 are two bolts with wingnuts. However, alternative types and/or quantities of fasteners 162 may extend downward from the base 152, and more generally, from the main body.

As also shown in FIGS. 1A-1G, the main housing 112 includes holes 180a and 180b, which can be collectively referred to as the holes 180, or individually as a hole 180. The holes 180 may be configured to accommodate additional components (e.g., ratcheting buttons, discussed below) to press against a backside of an upper body portion of a laptop, to thereby firmly secure laptops having various different thicknesses to the security bracket 102. In other words, the additional components (e.g., ratcheting buttons) that are used with the holes 180 enable the security bracket 102 to be used with various different laptops that have various different thicknesses, and more specifically, where upper portions of the laptops have various different thicknesses (i.e., a wide range of thicknesses).

Figure 1H:
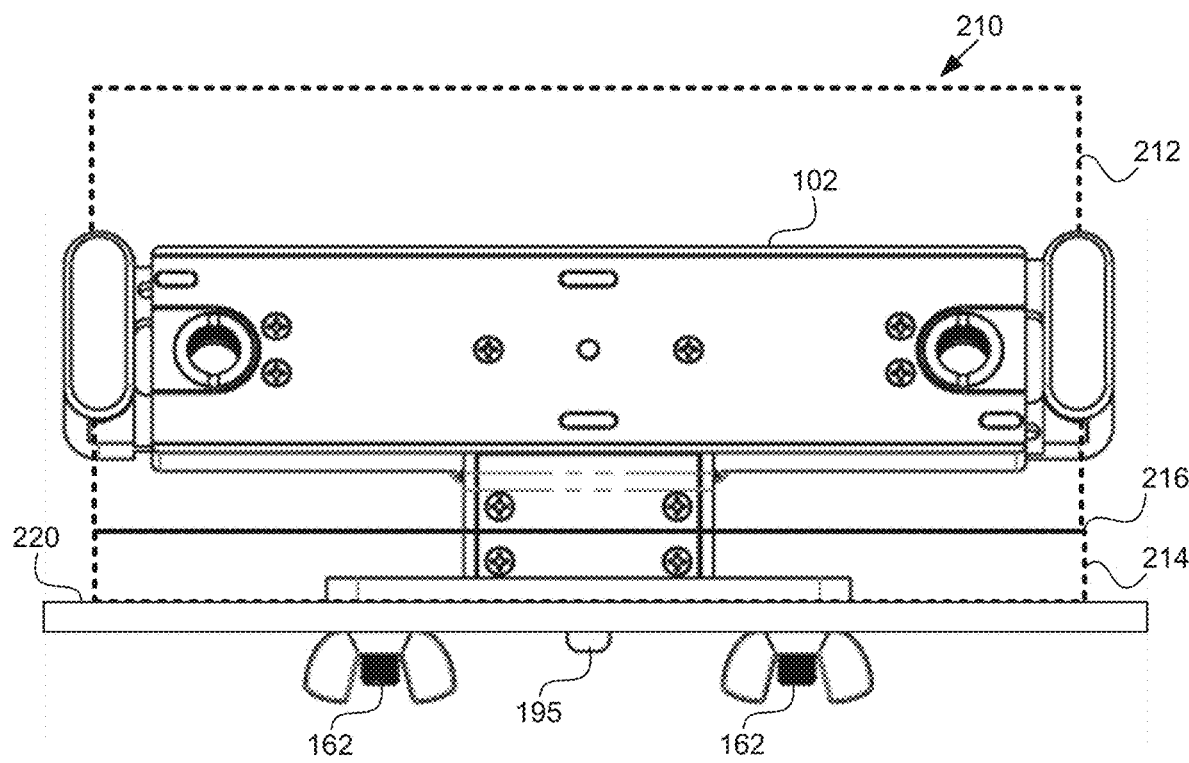
FIGS. 1H and 1I are, respectively, a front view and a side view of the adjustable laptop security bracket securing a laptop (shown in broken line) to a tabletop.
Figure 1I:
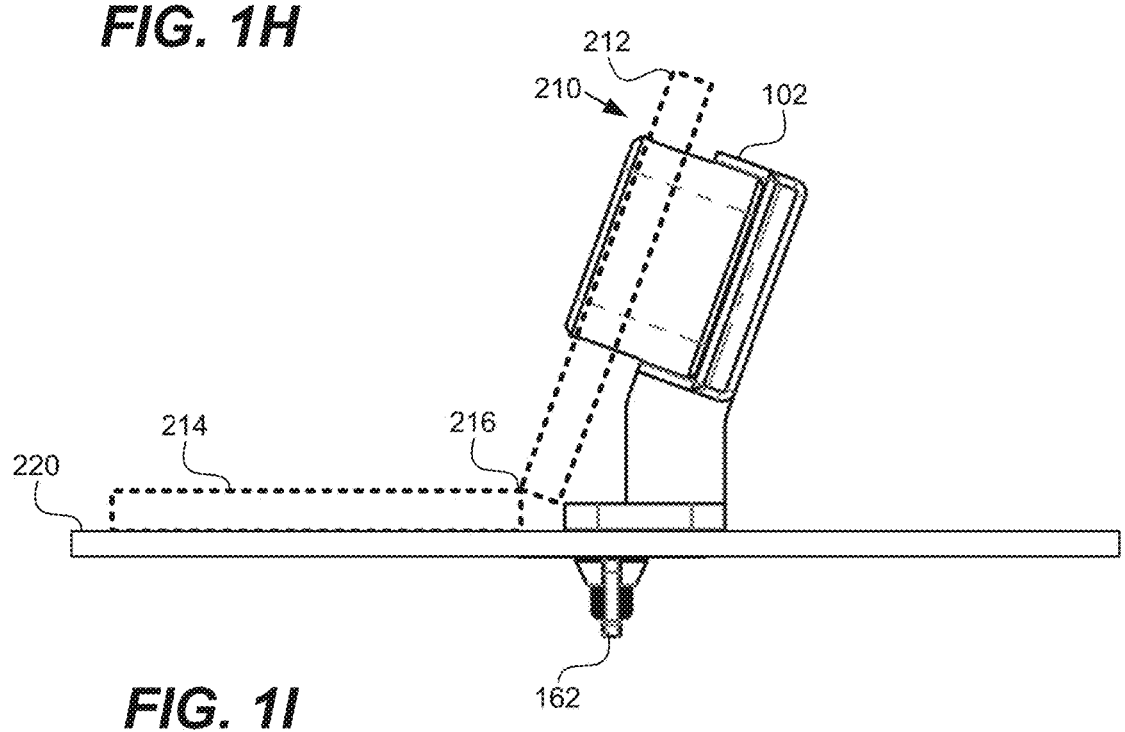

FIGS. 1H and 1I are, respectively, a front view and a side view of the adjustable laptop security bracket 102 securing a laptop 210 to a tabletop 220 or other display surface. The laptop 210 includes a lower body portion 214 and an upper body portion 212 that are attached to one another by a hinge 216, wherein the lower body portion 214 includes a keyboard, and the upper body portion 212 includes a display screen that may or may not be a touch screen. The lower body portion 214 may also include a touchpad or other type of pointing device that enables a cursor and/or other displayed elements to be maneuvered by a user. The hinge 216 allows the laptop 210 to be selectively put in either a closed position or an open position, and also enables the upper body portion 212 to be placed at a one a plurality of different angles relative to the lower body portion 214.

Figure 2A:
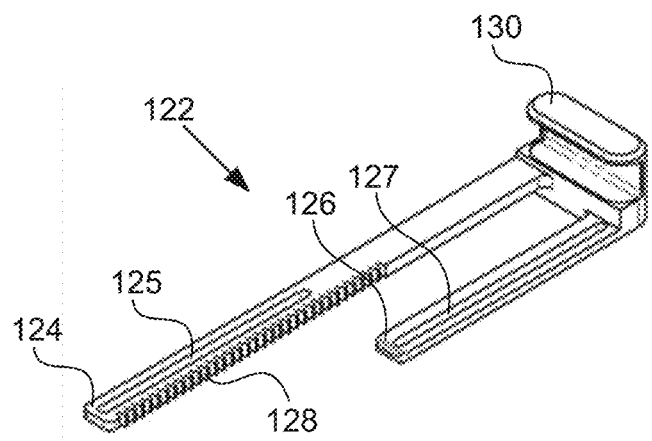
FIGS. 2A, 2B, 2C and 2D are, respectively, perspective, top, front and side views of one of the arms of the adjustable laptop security bracket, according to an embodiment of the present technology.
Figure 2B:
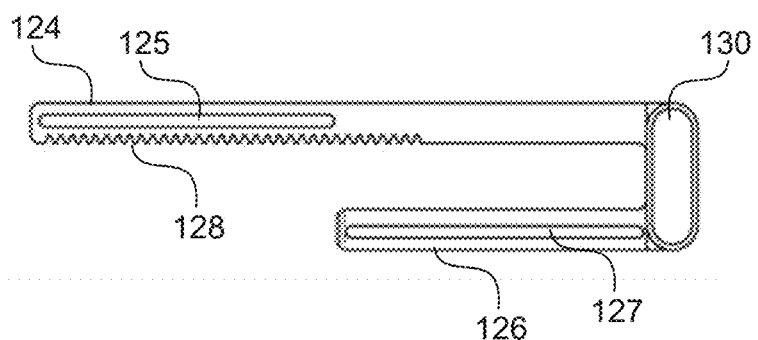
Figure 2C:
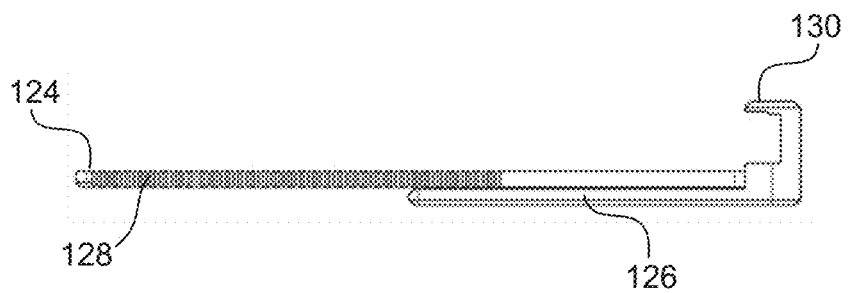
Figure 2D:
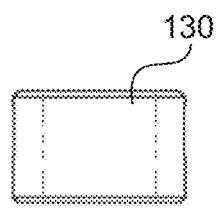

FIGS. 2A, 2B, 2C and 2D are, respectively, perspective, top, front and side views of one of the arms 122, e.g., the right arm 122b. The left arm 122a is the same as the right arm, but rotated 180 degrees. Indeed, in an embodiment the left and right arms 122a, 122b are identical to one another, i.e., are two separate instances of the same manufactured part, which simplifies manufacturing. The arm 122 includes a first appendage 124 and a second appendage 126 that are separated from one another by a gap. The first and second appendages 124, 126 include, respectively, elongated guide channels 125 and 127 that are parallel to another, and teeth on the first appendage 124 that form a toothed edge 128 that faces in a direction of the second appendage 126. The arm 122 also includes the inwardly projecting brace 130. As can be appreciated from FIG. 2C, the first and second appendages are not coplanar, but rather, they are slightly vertically offset from one another. This enables the first appendage 124 of the left arm 122a to slide above the second appendage 126 of the right arm 122a, and enables the first appendage of the right arm 122b to slide above the second appendage 126 of the left arm 122b. In FIG. 2C, the first appendage 124 is vertically above the second appendage 126. In an alternative embodiment, the second appendage 126 is instead vertically above the first appendage 124.

In certain embodiments, where the arms 122 are made of a metal or alloy, the inner surfaces of the braces 130 can be over-molding with a gripping material, such as a thermoplastic elastomer (TPE), rubber, silicon, polymeric material or other plastic, capable of increasing the adhesion, grip or coefficient of friction between the inner surfaces of the braces 130 and an upper body portion of a laptop. The gripping material should also reduce the probability of the braces scratching the upper body portion of a laptop.

Figure 2E:
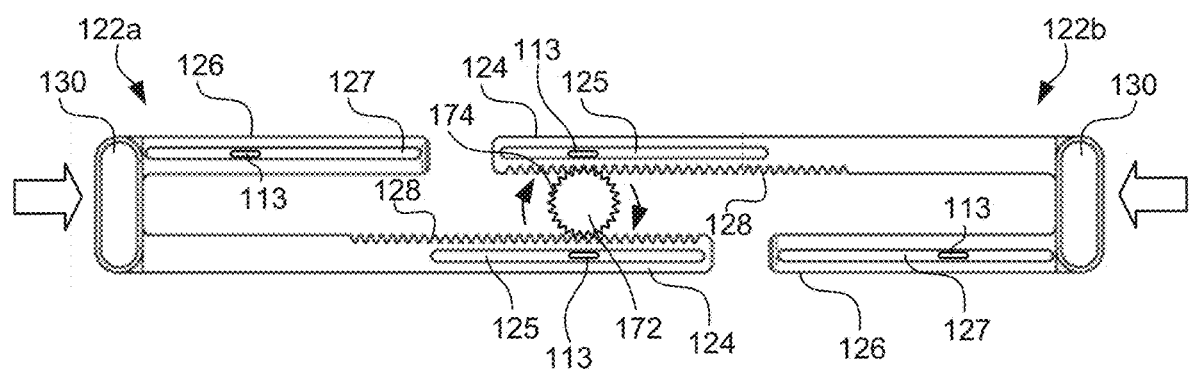
FIG. 2E illustrates how toothed edges of appendages of the arms of the adjustable laptop security bracket interact with a rotatable gear.

FIG. 2E illustrates how toothed edges 128 of the appendages 124 of the arms 122a and 122b interact with the rotatable gear 172. The toothed edge 128 of the appendage 124 of the left arm 122a provide a first rack gear. Similarly, the toothed edge 128 of the appendage 124 of the right arm 122b provide a second rack gear. The teeth 174 of the rotatable gear 172, which can also be referred to as a rotatable circular gear 172, intermesh with these first and second rack gears to thereby cause the left arm 122a and the right arm 122b to move in and out (aka, be retracted and extended) relative to the main housing 112 in tandem with one another. Protrusions 113 that extend from an interior of the main housing 112 fit within the guide channels 125 and 127 of the appendages 124 and 126 to act as guides for the arms 122, and maintain proper alignment of the arms 122 relative to the main housing 112 and one another. The teeth 174 of the rotatable gear 172, which are located about an outer circumference of the rotatable gear 172, can also be referred to as first engagement features. Additional details of the rotatable gear 172, according to an embodiment of the present technology, are described below with reference to FIGS. 3A-3G.

Figure 3A:
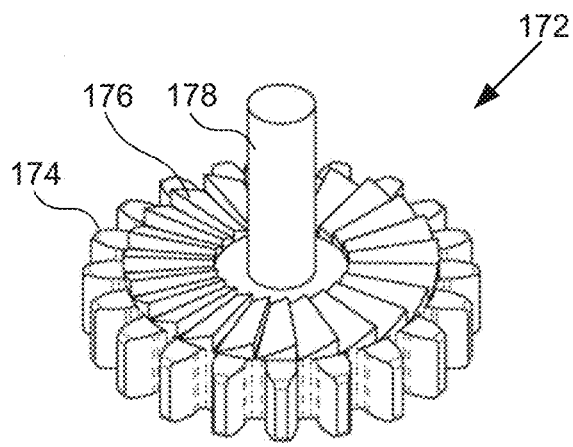
FIGS. 3A, 3B and 3C are, respectively, perspective, side and top views of a gear of the adjustable laptop security bracket, according to an embodiment of the present technology.
Figure 3B:
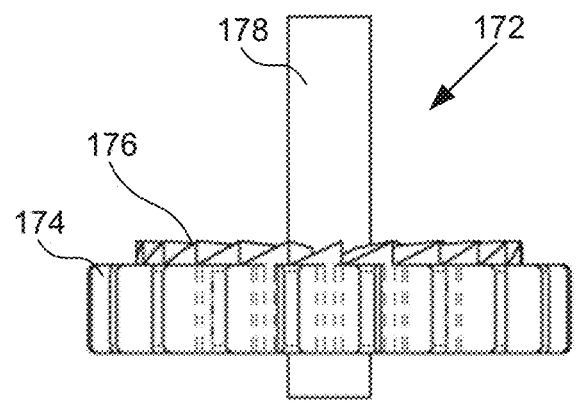
Figure 3C:
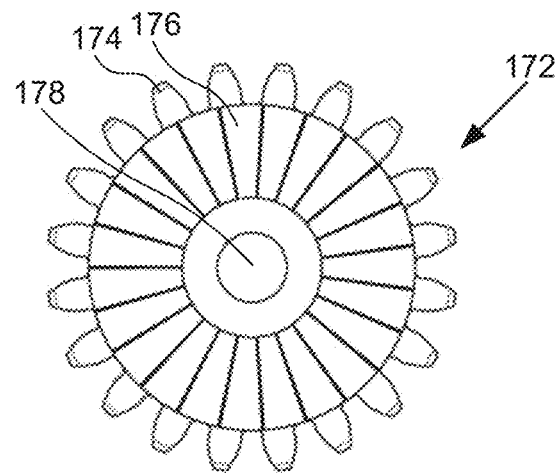
Figure 4A:
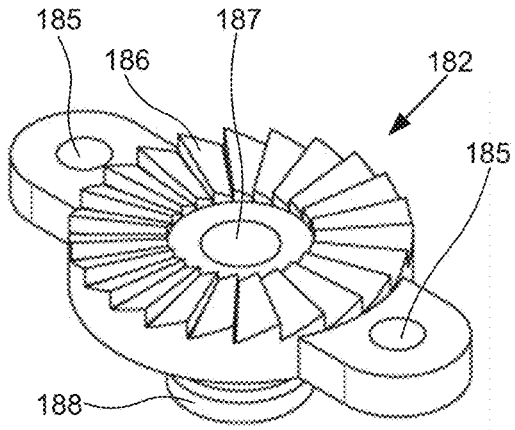
FIGS. 4A, 4B, 4C and 4D are, respectively, front perspective, rear perspective, top and side views of a gear stop, according to an embodiments of the present technology.
Figure 4B:
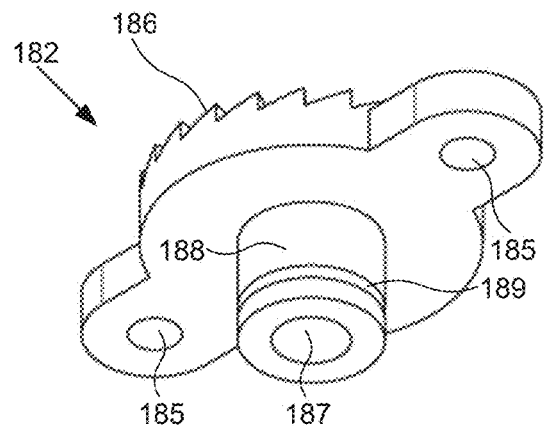
Figure 4C:
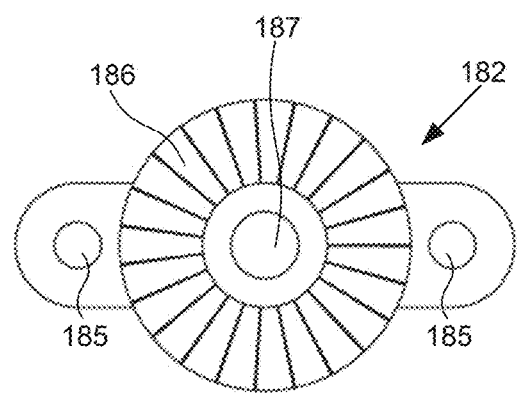
Figure 4D:
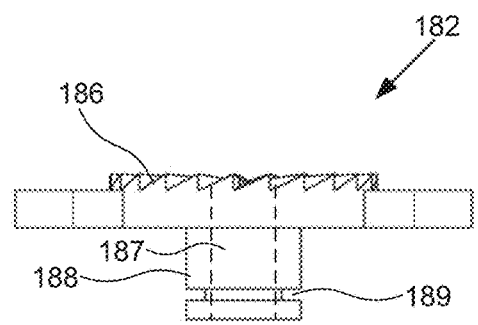
Figure 4E:
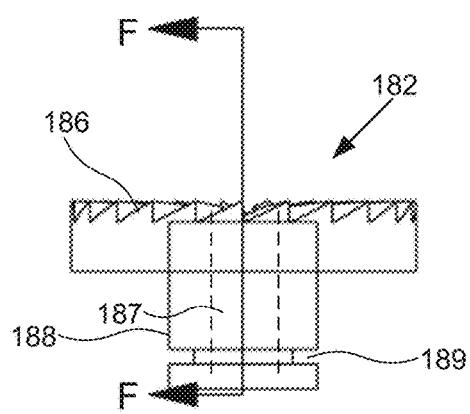
FIG. 4E is another side view of the gear stop.
Figure 4F:
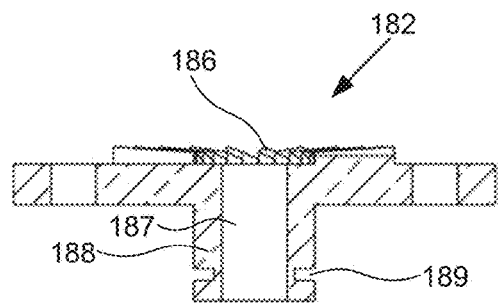
FIG. 4F is a section view of the gear stop along the lines F-F in FIG. 4E.

Referring to FIGS. 3A-3C, the rotatable gear 172 is shown as including the first engagement features 174 (e.g., teeth or cogs) about its outer circumference, and second engagement features 176 (e.g., teeth or cogs) along a backside of the rotatable gear 172. In the embodiment shown, the second engagement features 176 are right triangle teeth, as can be appreciated from FIG. 3B. The rotatable gear 172 also includes a cylindrical rod 178 extending (aka protruding) axially from the backside of the rotatable gear 172.

Referring briefly to FIGS. 4A-4F, the gear stop 182 includes engagement features 186 on a frontside thereof, which are configured to selectively engaged with the second engagement features 176 of the rotatable gear 172. In the embodiment shown, the engagement features 186 are right triangle teeth, as can be appreciated from FIG. 4D. A hollow dowel 188 extends from a backside of the gear stop 182. A circumferential groove 189 in the hollow dowel 188 is configured to accept a ring clip, also known as a C-clip, E-clip, E-ring or circlip, that is used to secure the gear stop 182 to a gear stop release lever 192, which are described below with reference to FIGS. 5A-5C and FIGS. 6A and 6B.

The gear stop 182 also includes a central hole 187 that extends axially through a center of the gear stop 182 and is sized to allow the cylindrical rod 178 of the rotatable gear 172 to fit within the hole 187. The gear stop 182 also includes a pair of guide holes 185 that are parallel to the central hole 187. The guide holes 185 are sized to accept protrusions 115 (shown in FIGS. 8A and 8B) within the main housing 112. As will be described in additional detail below, with reference to FIGS. 6A and 6B, a spring 190 normally biases the gear stop 182 against the rotatable gear 172. While the gear stop 182 is biased against the rotatable gear 172, such that the engagement features 186 of the gear stop 182 intermesh with the second engagement features 176 of the rotatable gear 172, the rotatable gear operates as a unidirectional gear that only allows that arms 122a and 122b of the security bracket 102 to be retracted, but prevents the arms 122a and 122b from being expanded. The above can be referred to herein as the unidirectional configuration.

As noted above, the gear stop 182 has a first position and a second position. When the gear stop 182 is in its first position, the engagement features 186 of the gear stop 182 are normally biased by the spring 190 against the engagement features 186 of the rotatable gear 172, during which the rotatable gear 172 is rotatable in one of a clockwise and counterclockwise directions that allows for the retraction of the left and right arms 122a, 122b in tandem relative to the main body, and during which the rotatable gear 172 is prevented from being rotated in the other one of the clockwise and counterclockwise directions, thereby preventing the extension of the left and right arms 122a, 122b. Accordingly, while the gear stop 182 is in its first position, the arms 122a, 122b can be manually retracted to thereby secure an upper body portion (e.g., 212) of a laptop (e.g., 210) between the braces 130 of the left and right arms 122a, 122b.

By contrast, when the gear stop 182 is in its second position, the engagement features 186 of the gear stop 182 are moved away from the engagement features 176 on the front side of the rotatable gear 172, during which the rotatable gear 172 is rotatable in both of the clockwise and counterclockwise directions, thereby allowing for the extension of the left and right arms 122a, 122b, as well as retraction of the left and right arms 122a, 122b. In the embodiment shown, it is the gear stop release lever 192 that is used to selectively transition the gear stop 182 from its first position to its second position. More specifically, to put the gear stop 182 in its second position, the gear stop release lever 192 is used to pull the gear stop 182 away from rotatable gear 172, overcoming the bias created by the spring 190, such that the engagement features 186 of the gear stop 182 do not intermesh with the second engagement features 176 of the rotatable gear 172. When the engagement features 186 of the gear stop 182 do not intermesh with the second engagement features 176 of the rotatable gear 172, the rotatable gear 172 operates as a unidirectional gear that allows that arms 122a and 122b of the security bracket 102 to be both expanded and retracted. The above can also be referred to herein as the bidirectional configuration. Accordingly, it can be appreciated that the adjustable security bracket 102 has both a unidirectional configuration and a bidirectional configuration.

Figure 5A:
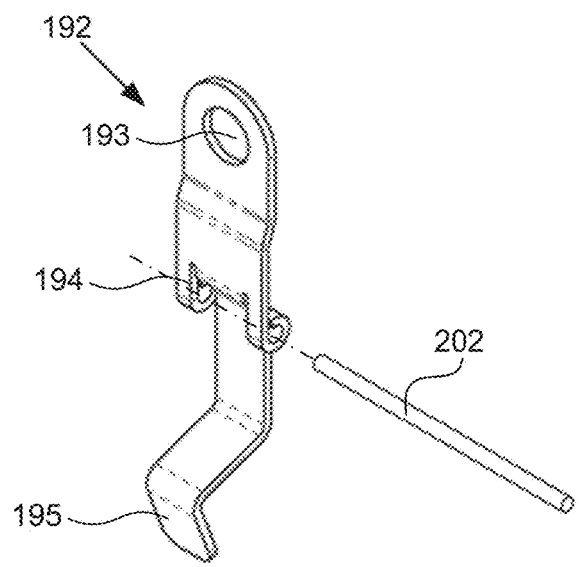
FIGS. 5A, 5B and 5C are, respectively, front perspective, front and side views of a gear stop release lever of the adjustable laptop security bracket, according to an embodiment of the present technology.
Figure 5B:
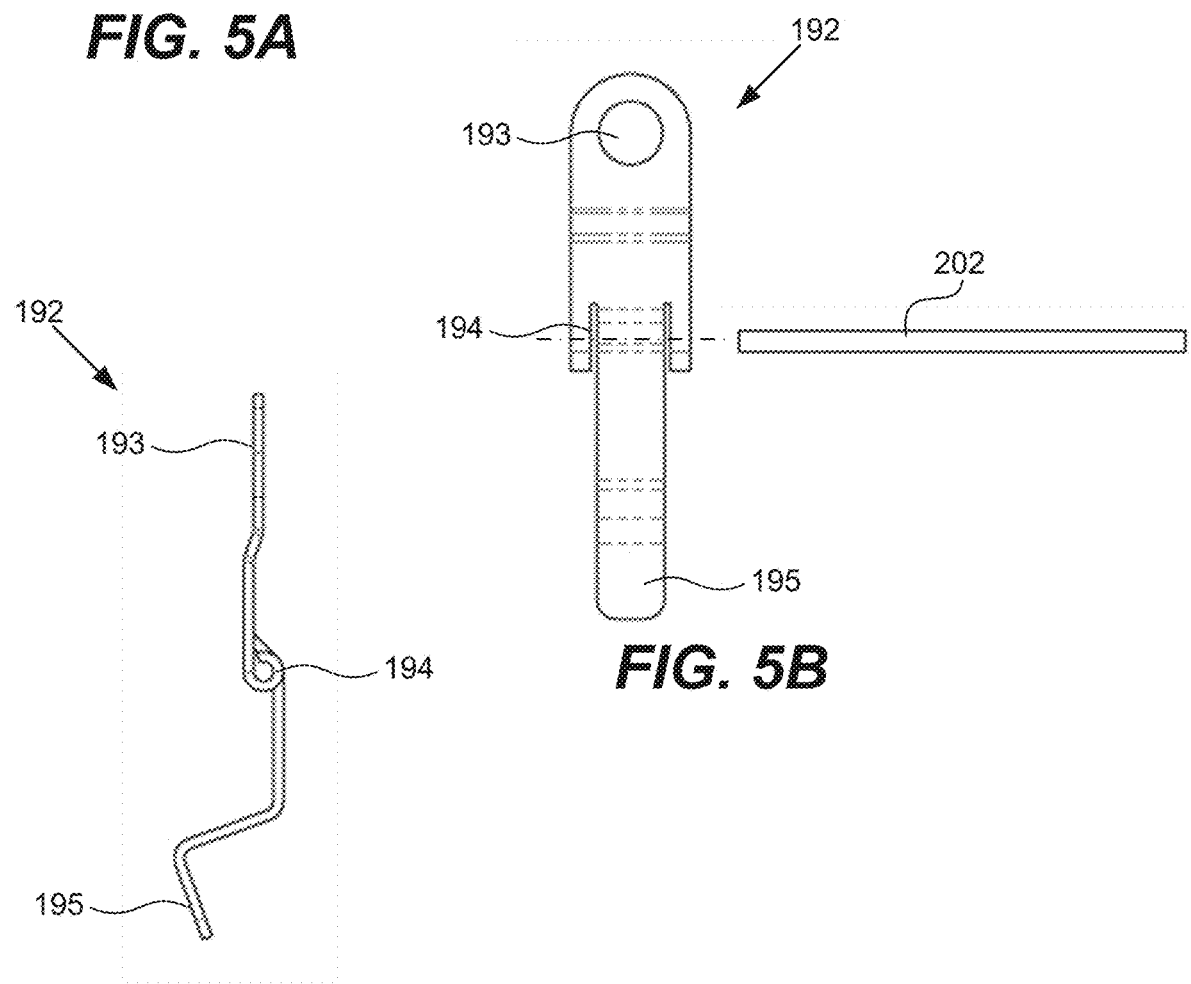
Figure 5C:
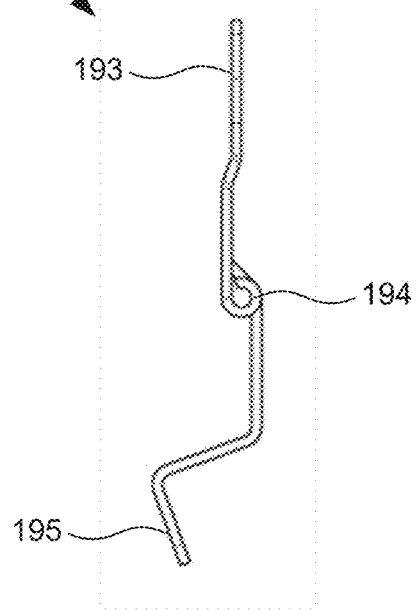
Figure 7:
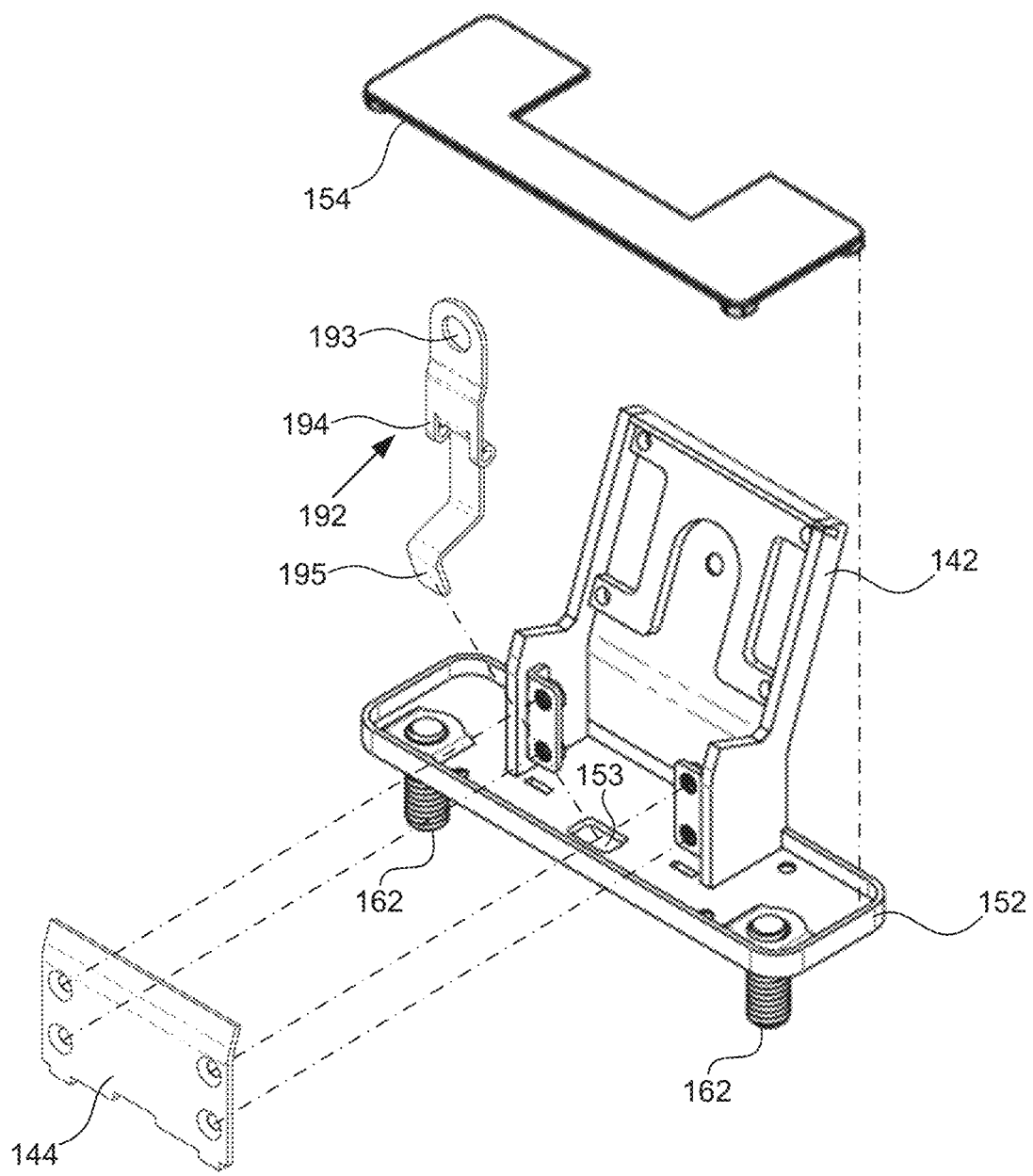
FIG. 7 is a perspective view of a pedestal and a base of the adjustable laptop security bracket, according to an embodiment of the present technology, with portions thereof removed.

Referring to FIGS. 5A-5C, the gear stop release lever 192 is shown as including an upper portion including an opening 193 (aka hole 193) that accepts the hollow dowel 188 of the gear stop 182. A central portion of the gear stop release lever 192 includes an opening 194 that is configured to accept a cylindrical rod 202 about which the lever 192 pivots. A lower portion of the gear stop release lever 192 includes a finger release tab 195. During assembly of the adjustable security bracket 102, the distal end of the hollow dowel 188 is inserted through the hole 193 and held in place by a ring clip 191 (also known as a C-clip, E-clip, E-ring or circlip) that is secured within the circumferential groove 189 of the hollow dowel 188, and is thereby used to secure the gear stop 182 to the gear stop release lever 192. Additionally, during assembly of the adjustable security bracket 102, the finger release tab 195 is inserted through an opening 153 in the base 152 (which opening 153 is shown in FIG. 7), and the cylindrical rod 202 is inserted through the opening 194 of the gear stop release lever 192, so that the lever 192 can pivot about the rod 202. The rod 202 is held in place by rod holders 204 of the main housing 112, which rod holders 204 are shown in FIGS. 8B-8E.

Figure 6A:
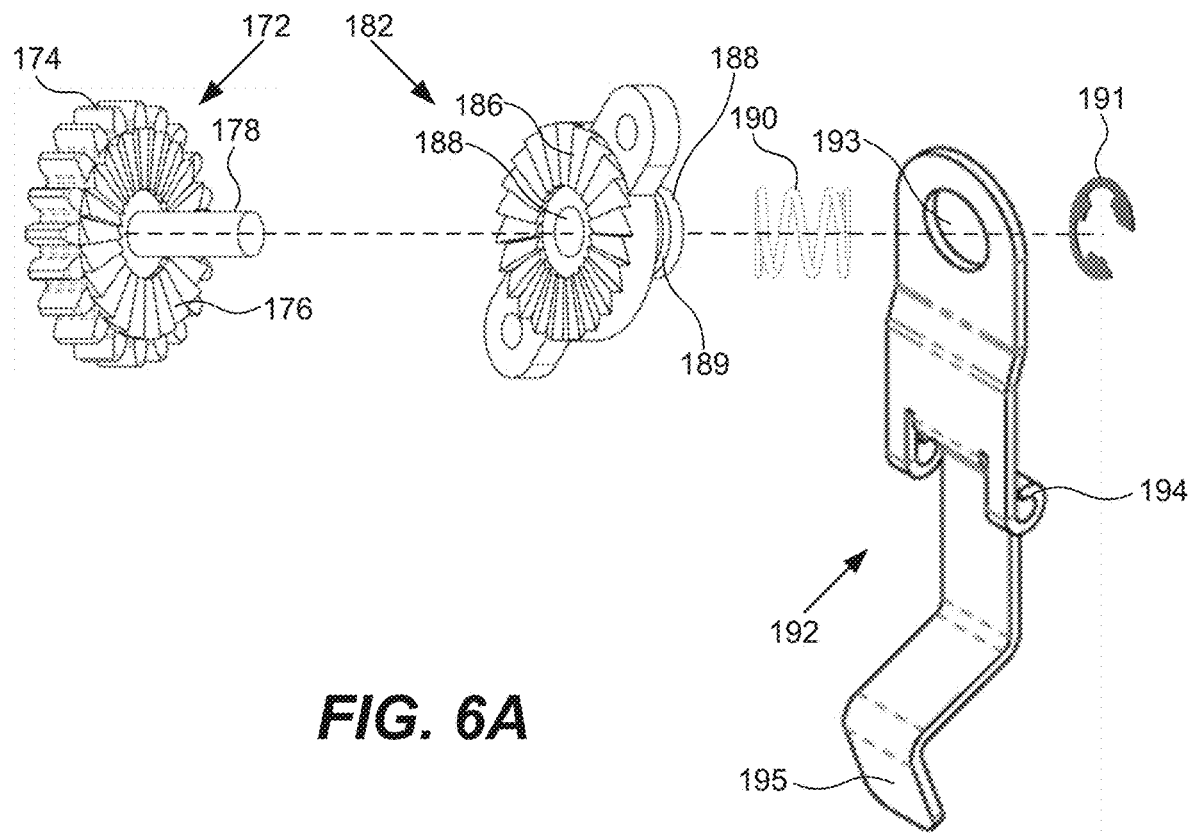
FIGS. 6A and 6B are used to show how the gear, gear stop and gear stop release lever operate according to an embodiment of the present technology.
Figure 6B:
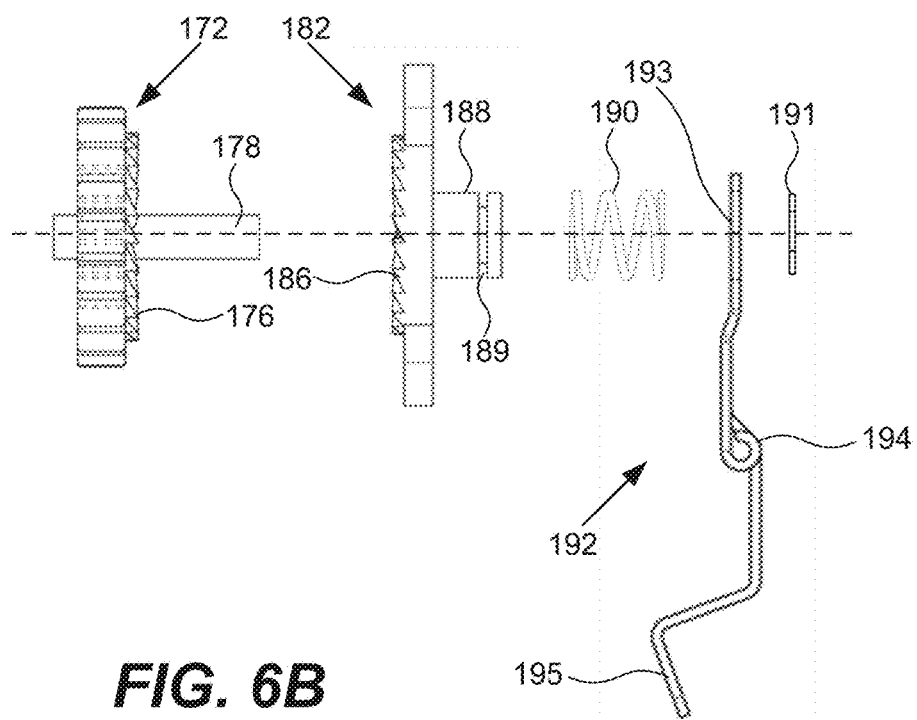

Referring to FIGS. 6A and 6B, as explained above, the spring 190 normally biases the gear stop 182 against the rotatable gear 172 such that the second engagement features 176 of the rotatable gear 172 or interlocked with the engagement features 186 of the gear stop 182. The spring 190, and the configurations of the second engagement features 176 (of the rotatable gear 172) and the engagement features 186 (of the gear stop 182), allow the rotatable gear 172 to be rotated in one of a clockwise and counterclockwise directions, and prevents the rotatable gear 172 from rotating in the other one of the clockwise and counterclockwise directions (so as to enable the arms 122 to be retracted when the gear stop 182 engages the gear 172, and prevent the arms 122 from be expanded when the gear stop 182 engages the gear 172). Accordingly, the rotatable gear 172 normally operates as a unidirectional gear that only allows the arms 122 to be retracted towards the main housing 112, except when the gear stop release lever 192 is used to overcome the normal biasing of the spring 190 and move the gear stop 182 away from the rotatable gear 172, during which the rotatable gear 172 operates as a bidirectional gear that allows the arms 122 to be retracted towards the main housing 112 and expanded away from the main housing 112. As can be appreciated from the above description, the adjustable laptop security bracket 102 is normally in its unidirectional configuration when the tab 195 is not being pressed, transitions from its unidirectional configuration to its bidirectional configuration in response to the tab 195 being pressed, and returns to its unidirectional configuration when the tab 195 is no longer being pressed.

FIG. 7 is a perspective view of the pedestal 142 and the base 152 of the adjustable laptop security bracket 102, with the front plate 144 of the pedestal removed, and the upper plate 154 of the base 152 removed. When the security bracket 102 is assembled, the finger release tab 195 extends downward through the opening 153 in a bottom of the base 152.

Figure 8A:
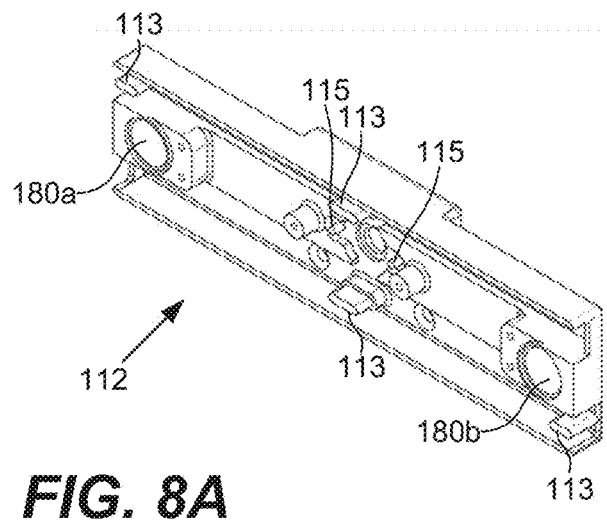
FIGS. 8A, 8B, 8C and 8D are, respectively, front perspective, front, top and side views of the main housing, with a front plate thereof removed, according to an embodiment of the present technology.
Figure 8B:
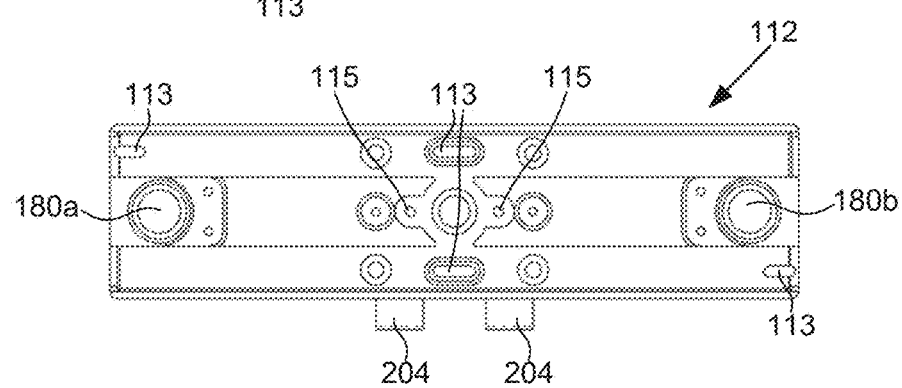
Figure 8C:
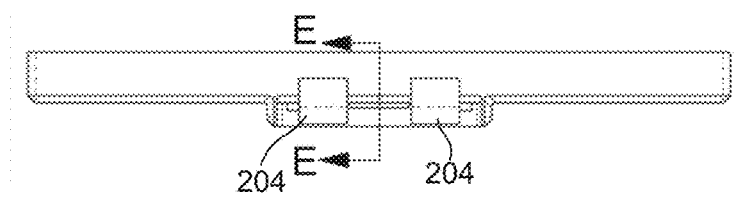
Figure 8D:
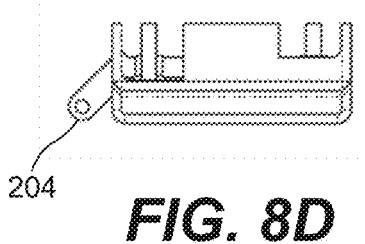
Figure 8E:
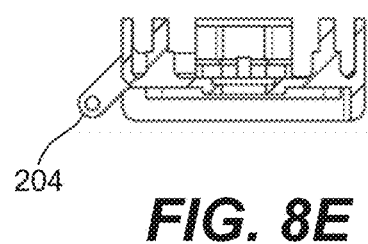
FIG. 8E is a section view of the main housing 112 along the lines E-E in FIG. 8C.

FIGS. 8A, 8B, 8C and 8D are, respectively, front perspective, front, top and side views of the main housing 112, with the front plate 114 removed, according to an embodiment of the present technology. FIG. 8E is a section view of the main housing 112 along the lines E-E in FIG. 8C. As can be seen in FIGS. 8A and 8B, as well as other FIGS., the main housing 112 is shown as including a pair of holes 180 (180a and 180b) that accept ratcheting buttons (e.g., 940), which are described below with reference to FIGS. 9A-11G. Instead of the holes 180 being located in the main housing 112, the holes 180 can instead be located in the arms 122, e.g., the hole 180a can be located in a portion of the arm 122a, and the hole 180b can be located in a portion of the arm 122b.

As noted above, the protrusions 113 that extend from an interior of the main housing 112 fit within the guide channels 125 and 127 of the appendages 124 and 126 to act as guides for the arms 122, and maintain proper alignment of the arms 122 relative to the main housing 112 and one another. Additionally, the further protrusions 115 that extend from an interior of the main housing 112 fit within the guide holes 185 of the gear stop 182 to acts as guides for the gear stop 182 as the gear stop moves between its normally biased first position and its second position.

As noted above, the braces 130 on the arms 122 may have dimensions to accommodate a range of device thicknesses, and more specifically, a range up thicknesses for the upper body portions of laptops. This may result in a gap between the main housing 112 and an upper body portion of a laptop that is secured by the braces 130 to the adjustable security bracket 102, which gap may enable the laptop to be maneuvered relative to the adjustable security bracket 102 and potentially removed from the adjustable security bracket 102 by a thief. To eliminate or remove this gap, and more specifically, to tightly secure an upper body portion of a laptop to the adjustable security bracket 102, the holes 180 and respective ratcheting buttons are used, as described below in more detail. Accordingly, aspects of the present technology enable use of braces 130 that can accommodate upper body portions of laptops having a wide range of thicknesses (e.g., not customized for each laptop) while eliminating or reducing gaps between the adjustable security bracket 102 and the upper body portions of laptops.

Additional details of the holes 180, and the ratcheting buttons that can be used therewith, according to various embodiments, are also described below with reference to FIGS. 9A-11G. In certain embodiments, each such ratcheting button is located in a corresponding hole in the main housing 112 (or alternatively in an arm 122), wherein each ratcheting button is configured to be movable in a first direction within the corresponding hole with a ratchet mechanism to prevent movement of the ratcheting button in a second direction, opposite the first direction, within the corresponding hole. The ratcheting buttons are configured to press against the backside of the upper body portion of a laptop that is secured between the arms 122 of the adjustable security bracket 102 so that the upper body portion of the laptop (which upper body portion includes a display) is firmly grasped by the security bracket 102. This may eliminate or reduce any gaps between the security bracket 102 and the upper body portion of the laptop and may thereby eliminate or reduce gaps that might be used for insertion of tools (e.g., for a crowbar, screwdriver, or other prying instrument) that could be used to remove a laptop from the security bracket 102.

Figure 9A:
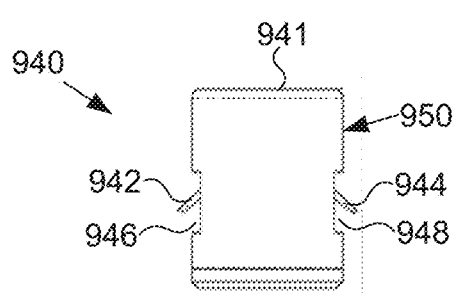
FIGS. 9A-C illustrate ratcheting buttons of the adjustable laptop security bracket, according to an embodiment of the present technology.
Figure 9B:
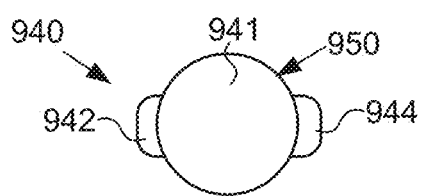

FIGS. 9A and 9B illustrate an example of a ratcheting button 940 that may be used in combination with any of the holes 180 above (e.g., holes 180a and 180b in main housing 112) or similar holes. The ratcheting button 940 includes a first pawl 942 and a second pawl 944 extending from opposite sides of ratcheting button 940. In other examples, different numbers of pawls may be provided (e.g., one pawl, or more than two pawls). The ratcheting button 940 has a cylindrical shape with the first pawl 942 extending through a first opening 946 and the second pawl 944 extending through a second opening 948 in a cylindrical outer wall 950 so that they both extend beyond the cylindrical outer wall 950 (e.g., beyond the radius of the cylindrical outer wall 950).

FIG. 9B shows a top-down view of the ratcheting button 940 that shows how the first pawl 942 and the second pawl 944 extend beyond the cylindrical outer wall 950 of the ratcheting button 940. In this arrangement, the first pawl 942 and the second pawl 944 are configured to engage one or more ratchet surface(s) that may be present on a cylindrical inner wall of a corresponding hole.

Figure 9C:
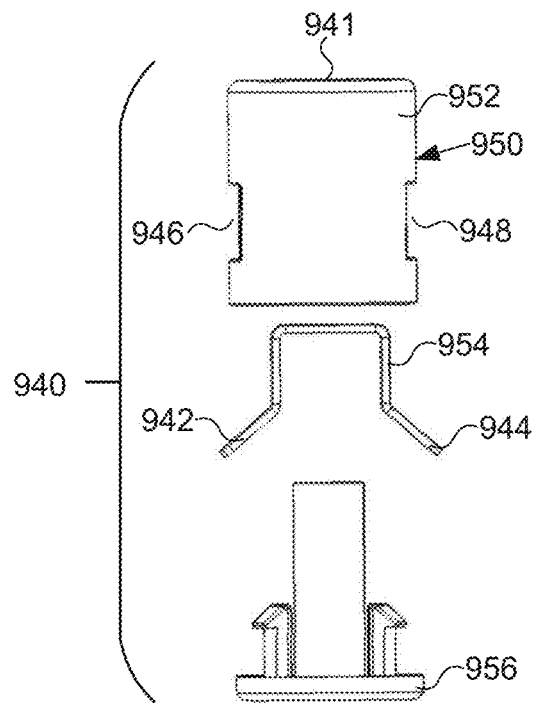

FIG. 9C shows an exploded view of the ratcheting button 940 that includes a cylindrical thimble portion 952 with the first opening 946 and the second opening 948 on opposite sides of the cylindrical outer wall 950. The ratcheting button 940 includes a spring 954 (to be located in the cylindrical thimble portion 952), with a first end (to extend through the first opening 946) to form the first pawl 942 and a second end (to extend through the second opening 948) to form the second pawl 944. The spring 954 may be formed of a suitable spring material (e.g., a metal, such as steel, or an alloy) so that it is elastic and can be deformed, or deflected, and return to its original shape. Thus, the first pawl 942 and the second pawl 944 may be deflected inwards (towards the center of the ratcheting button 940) and returned to their prior configuration as ratcheting button is moved in a hole with one or more ratchet surface. A thimble cap 956 is provided to maintain the spring 954 in a specified location, with the first pawl 942 extending through the first opening 946 and the second pawl 944 extending through the second opening 948 and to provide a surface for applying upward force on the ratcheting button 940. In certain embodiments, an upper surface 941 of the ratcheting button 940, and more specifically the cylindrical thimble portion 952, can be over-molding with a gripping material, such as a TPE, rubber, silicon, polymeric material or other plastic, capable of increasing the adhesion, grip or coefficient of friction between the backside of an upper body portion of a laptop and the upper surface 941 of the ratcheting buttons 940.

FIGS. 10A-B illustrate the ratcheting button 940 in a hole (e.g., 180) and how the pawls 942, 944 engage the ratchet surface 938. FIGS. 10A-B shows the ratchet surface 938 extending circumferentially (through 360 degrees) about a central axis 1060 to engage the first pawl 942 and the second pawl 944. The hole 180 is cylindrically symmetric about the central axis 1060 so that ratchet surface 938 can be seen on both sides of the ratcheting button 940 in FIG. 10A and the ratchet surface 938 thus engages both pawls. The ratcheting button 940 is generally cylindrical, with the cylindrical outer wall 950 being defined by an axis that, when inserted in the hole 180, coincides with central axis 1060. Movement of ratcheting button 940 is generally in a first direction (represented by the arrow 1002) along central axis 1060. The ratcheting button 940 fits in the hole 180 with some small clearance between the cylindrical outer wall 950 and teeth of the ratchet surface 938. Indentations between teeth of the ratchet surface 938 allow the first pawl 942 and the second pawl 944 to extend beyond the cylindrical outer wall 950 and engage the ratchet surface 938. When pushed in the first direction 1002, the first pawl 942 and the second pawl 944 are deflected inwards (towards the central axis 1060) by teeth of the ratchet surface 938 as the spring 954 bends and then spring outwards into indentations of the ratchet surface 938 (FIG. 10B shows the ratchet surface 938 as a shaded ring indicating the depth of teeth and indentations).

When pushed in a second direction (represented by the arrow 1004) that is opposite the first direction 1002, the first pawl 942 and the second pawl 944 engage the ratchet surface 938 and prevent movement of the ratcheting button 940 in the second direction 1004. Thus, the combination of the first pawl 942, the second pawl 944 and the ratchet surface 938 provide a ratchet mechanism to prevent movement of the ratcheting button 940 in the second direction 1004 within corresponding hole 830. Because the ratcheting button 940 cannot move in the second direction 1004 in the hole 180, returning the ratcheting button 940 to a lower position (e.g., to allow insertion of another laptop) may include pushing the ratcheting button 940 all the way through and out of the hole 180 in the first direction 1002 and then reinserting it into the hole 180 in what may be referred to as a "push-through" configuration, which can only be performed when a security bracket 102 that includes the hole 180 and the ratcheting button 940 is not being used to secure a laptop.

While the example shown in FIGS. 10A-B includes a ratcheting button with a cylindrical outer wall that fits in a cylindrical hole, other shapes may also be used (e.g., square, rectangular, polygonal, elliptical, or other). A ratcheting surface or ratcheting surfaces may be configured according to the shape used and the location(s) of any pawl(s).

In an alternative to the push-through arrangement above, a ratcheting button (e.g., ratcheting button 940) may have two configurations. In a first configuration, the ratcheting mechanism prevents movement in the second direction 1004 while in a second configuration the ratcheting mechanism is disengaged to enable movement in the second direction 1004.

FIGS. 11A-D illustrate an example of a hole 1170 (e.g., any of the holes 180 in the main housing 112 or holes in the arms 122) containing the ratcheting button 940. The hole 1170 has a cylindrical inner wall including a first ratchet surface 1172 and a second ratchet surface 1174 on opposite sides of the hole 1170 (with shading to indicate depth of teeth/indentations). The ratchet surfaces 1172, 1174 are separated by a first recess 1176 and a second recess 1178, where no teeth are located so that no ratchet surface is present (e.g., an inner wall may be smooth).

Figure 11A:
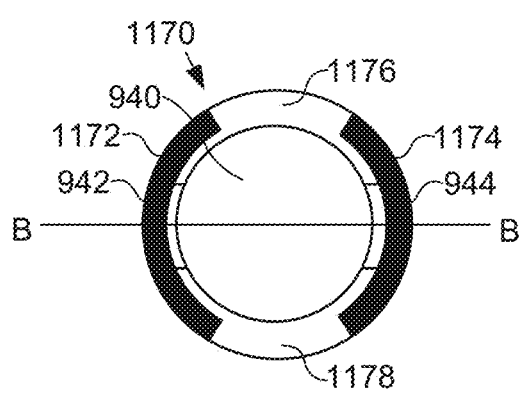
FIGS. 11A-G illustrate examples of ratcheting buttons showing engagement and disengagement from two ratchet surfaces on an inner wall of a hole.
Figure 11B:
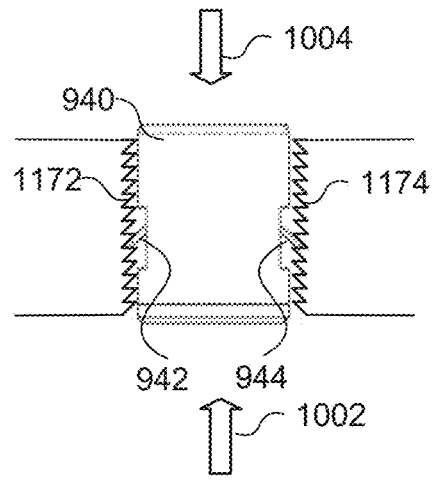

In the configuration illustrated in FIGS. 11A-B, the ratcheting button 940 has a first orientation (with pawls extending on either side in this view) in which the first pawl 942 engages the first ratchet surface 1172 and the second pawl 944 engages the second ratchet surface 1174 to prevent movement of the ratcheting button 940 in the second direction 1004. FIG. 11A shows a top-down view and FIG. 11B shows a cross sectional view along the plane marked B-B in FIG. 11A. In this orientation, ratcheting button 940 can only be moved upwards and cannot be moved downwards.

Figure 11C:
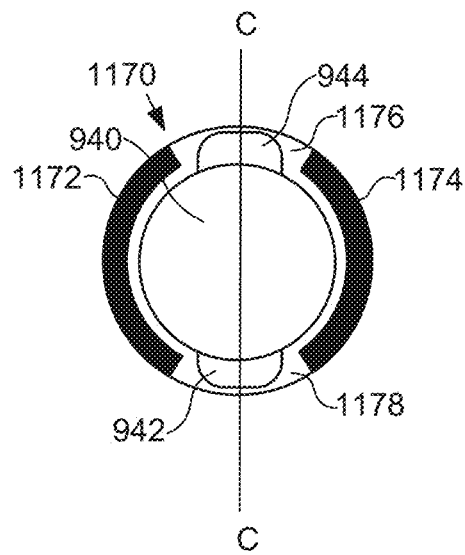
Figure 11D:
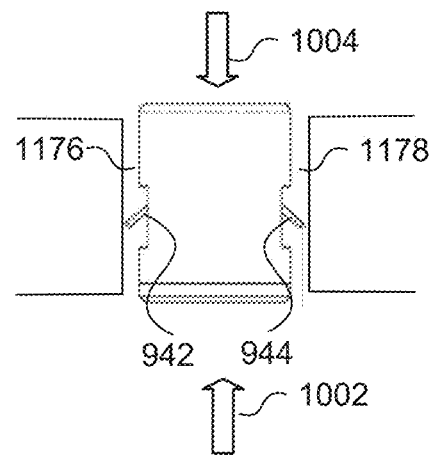

The ratcheting button 940 is rotatable within the hole 1170 and FIGS. 11C-D illustrate the ratcheting button 940 in a second configuration (second orientation) that results from rotating it about ninety degrees (90°). FIG. 11C shows a top-down view and FIG. 11D shows a cross sectional view along the plane marked C-C in FIG. 11C. When the ratcheting button 940 is in the second orientation shown, the first pawl 943 aligns with the first recess 1176 and the second pawl 944 aligns with the second recess 1178 so that first and second pawls 942 and 944 do not engage the first and second ratchet surfaces 1172 and 1174. In this orientation, the ratcheting button 940 may be moved in the first or second directions 1002 or 1004. This may allow the ratcheting button 940 to be repositioned (lowered) for insertion of an upper body portion of a laptop without removing the ratcheting button 940 from the hole 1170. In some cases, a ratcheting button may be captured within such a hole with downward movement enabled by rotating the ratcheting button to an appropriate orientation. Such a ratcheting button that can be repositioned without removal from a corresponding hole and/or is captured within the corresponding hole reduces the risk of losing or damaging the ratcheting button.

Features may be provided on the ratcheting button 940 to facilitate access for rotation of the ratcheting button 940 from the frontside of the apparatus 102 so that any such features are not accessible when a portable electronic device is present. For example, features for engaging a tool (e.g., a slot for a screwdriver) or for rotation by hand (e.g., a surface that is textured for enhanced grip) may be provided on the top (aka front) of the ratcheting button 940 and not on the bottom (aka back) (which may be smooth), so that the features that allow for manual rotation of the ratcheting button can only be accessed when a security bracket that includes hole 1170 and ratcheting button 940 is not being used to secure a laptop.

Figure 11E:
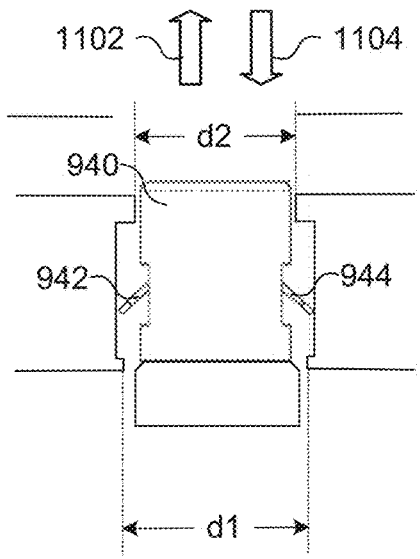
Figure 11F:
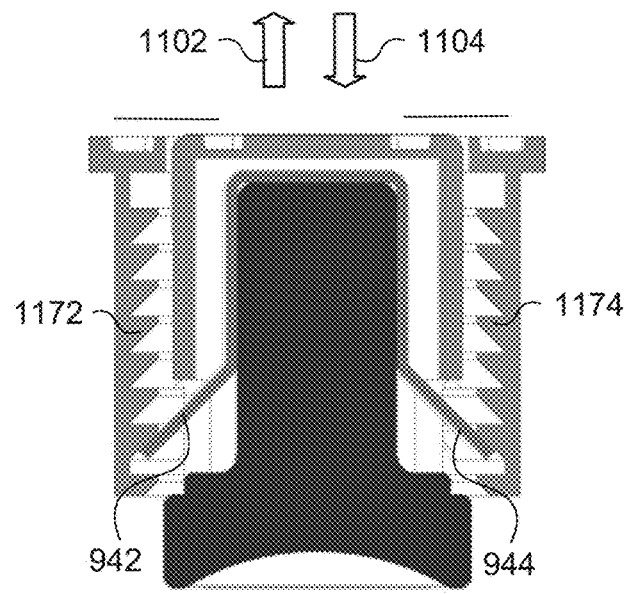

FIGS. 11E-F show examples of the ratcheting button 940 captured within a hole that includes a first opening having a diameter of d1 and a second opening having a diameter of d2. Diameters d1 and d2 may be sufficiently narrow to ensure that ratcheting button 940 cannot be removed from the hole after insertion. For example, the pawls 942, 944 and/or other features of the ratcheting button 940 may extend beyond the diameter d2 to ensure that the ratcheting button 940 cannot be beyond a specified limit. The pawls 942, 944 and/or other features of the ratcheting button 940 may extend beyond the diameter d1 to ensure that the ratcheting button 940 cannot be pushed on the second direction 1004 beyond a specified limit (e.g., after initial insertion, the pawls 942, 944 in their extended configuration may prevent removal in a the direction 1004).

FIG. 11F shows a cross-sectional view of an implementation of the ratcheting button 940 including the pawls 942, 944 engaging the first and second ratchet surfaces 1172 and 1174, with the ratcheting button 940 captured so that it cannot be removed. The ratcheting button 940 may remain captured within the hole regardless of rotation (e.g., regardless of whether pawls are aligned with ratchet surfaces or not).

In an example implementation, rotation of a ratcheting button (e.g., rotation between an orientation in which pawls engage ratchet surfaces and an orientation in which pawls are disengaged) may only be enabled when the ratcheting button is one or more vertical position. For example, when a ratcheting button is at or near a first limit of its range and/or at or near a second limit of its range, it may be rotatable. Otherwise, rotation may be prevented to avoid rotation and movement of a ratcheting button that has been ratcheted to engage a backside of an upper body portion of a laptop. With no laptop in place (e.g., after removal of a laptop) such a ratcheting button may be moved and rotated to disengage the pawls so that it can be moved within the hole. Subsequently, it may be rotated to engage pawls so that it can be moved to secure a laptop.

Figure 11G:
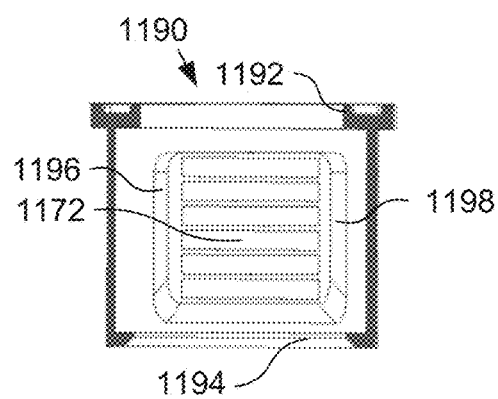

FIG. 11G shows an example implementation of a hole 1190 with features to limit movement of a ratcheting button. FIG. 11G shows a cross sectional view of the hole 1190 that includes a flange 1192 extending about a first part of the hole 1190 to reduce the diameter of the upper part of the hole 1190 (e.g., to a diameter d2 as shown in FIG. 11E) and a flange 1194 extending about a second part of the hole 1190 to reduce the diameter of the first part of the hole 1190 (e.g., to a diameter d1 as shown in FIG. 11E). The flanges 1192 and 1194 may capture a ratcheting button in the hole 1190. FIG. 11G also shows the first ratchet surface 1172 on a portion of the inner wall of the hole 1190 (an opposing second ratcheting surface is not visible in this view). A first sidewall 1196 and a second sidewall 1198 extend vertically along sides of the ratchet surface 1172 to constrain a pawl (e.g., the first pawl 942 or the second pawl 944) and prevent rotation of a ratcheting button when a pawl is engaged with first ratchet surface 1172. The ratchet surface 1172 and the sidewalls 1196, 1198 do not extend up to flange 1192 or down to flange 1194 so that there are gaps at the top and bottom to allow disengagement of pawls and rotation of a ratcheting button. While this provides an example of a hole configured to capture a ratcheting button and limit its rotation, other configurations may also be used.

Each of the elements of the security bracket 102 are preferably made of a strong metal or alloy (aka metal/alloy) so that the security bracket 102 is sturdy and cannot be readily bent, cut through, or otherwise broken or tempered with. For example, such elements can be made of steel. Different elements of the security bracket 102 can be made of the same metal/alloy or different metals/alloys than other elements. All or subsets of such elements can be painted, powder coated, or otherwise covered to have any desired color and appearance. Certain elements of the security bracket 102 can be molded, cast and/or machined. Certain elements of the security bracket 102 can be made from blanks that are cut (e.g., laser cut or mechanically cut) or stamped from a sheet of metal/alloy, and then bent if appropriate into a desired final configuration. It would also be possible that certain elements, such as the front plate 114 of the main housing 112 be made of a strong plastic, where such elements is/are not accessible while the security bracket 102 is securing a laptop to a display surface.

The adjustable security brackets of the embodiments of the present technology can be used to secure laptops to other display surfaces besides a horizontal display table. For example, such apparatuses can also be used to secure laptops to a vertical display wall, if desired, or more generally, to any one of various different types of display surfaces. As could be appreciated from the above discussion, because of the adjustability of the security bracket 102, the security bracket can beneficially be used with laptops of various different dimensions, including various different widths, depths, and thicknesses.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, without additional context, use of numerical terms such as a "first" object, a "second" object, and a "third" object may not imply an ordering of objects, but may instead be used for identification purposes to identify different objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus for physically securing a laptop in an open position to a display surface, wherein the laptop includes a lower body portion including a keyboard and an upper body portion including a display screen and attached to the lower body portion by a hinge, the apparatus comprising:
    a main body;
    one or more fasteners extending downward from the main body and configured to secure the main body to the display surface;
    left and right arms;
    a rotatable gear including first engagement features extending from an outer circumference of the rotatable gear, and also including second engagement features extending from a side of the rotatable gear; and
    a gear stop including third engagement features facing the second engagement features of the rotatable gear;
    wherein the first engagement features of the rotatable gear engage portions of the left and right arms to provide for extension and retraction of the left and right arms in tandem relative to the main body;
    wherein the gear stop has a first position and a second position;
    wherein when the gear stop is in the first position, the third engagement features of the gear stop are biased against the second engagement features of the rotatable gear, during which the rotatable gear is rotatable in one of a clockwise and counterclockwise directions that allows for retraction of the left and right arms in tandem relative to the main body, and during which the rotatable gear is prevented from being rotated in the other one of the clockwise and counterclockwise directions, thereby preventing the extension of the left and right arms; and
    wherein when the gear stop is in the second position, the third engagement features of the gear stop are moved away from the second engagement features of the rotatable gear, during which the rotatable gear is rotatable in both of the clockwise and counterclockwise directions, thereby allowing for the extension of the left and right arms.

2. The apparatus of claim 1, wherein the main body comprises:
    a main housing from which the left and right arms are extendable and retractable in tandem, and within which are located the rotatable gear and the gear stop;
    a base from which the one or more fasteners extend downward; and
    a pedestal that supports the main housing above the base at a distance above the display surface to which the apparatus is attached using the one or more fasteners.

3. The apparatus of claim 1, wherein the portions of the left and right arms that engage the rotatable gear comprise rack gears of the left and right arms.

4. The apparatus of claim 3, wherein:
    the first engagement features of the rotatable gear comprise teeth extending from the outer circumference of the rotatable gear; and the teeth extending from the outer circumference of the rotatable gear are configured to intermesh with teeth of the rack gears of the left and right arms.

5. The apparatus of claim 1, wherein:
the second engagement features of the rotatable gear comprise right triangle teeth extending from the side of the rotatable gear; and
the third engagement features of the gear stop comprise further right triangle teeth extending from the gear stop.

6. The apparatus of claim 1, further comprising:
a spring configured to normally bias the gear stop in the first position.

7. The apparatus of claim 6, further comprising:
a lever configured to selectively overcome the bias of the spring and move the gear stop from the first position to the second position;
wherein a portion of the lever extends through an opening in a bottom of the main body.

8. The apparatus of claim 7, wherein
the portion of the lever that extends through the opening in the bottom of the main body comprises a finger release tab; and
the finger release tab is configured to cause the lever to pivot about a pivot point that is between the finger release tab and a portion of the lever that is attached to the gear stop.

9. The apparatus of claim 8, wherein:
the finger release tab is inaccessible, except from an underside of the display surface, when the apparatus is attached to the display surface, thereby preventing someone from releasing the left and right arms after the left and right arms have been retracted to secure the upper body portion of the laptop to the main body and the gear stop is in the first position.

10. The apparatus of claim 1, wherein:
the left and right arms comprise, respectively, left and right braces configured to engage left and right sides of the upper body portion of the laptop so that the apparatus can accommodate various different widths that the laptop may have.

11. The apparatus of claim 10, further comprising:
one or more holes in the main body; and
one or more ratcheting buttons each of which is located in a corresponding one of the one or more holes;
the one or more ratcheting buttons configured to push against a backside of the upper body portion of the laptop that is secured between the left and right braces of the left and right arms so that the apparatus can accommodate various different thicknesses that the upper body portion of the laptop may have.

12. The apparatus of claim 11, wherein each ratcheting button, of the one or more ratcheting buttons, is configured to:
be movable in a first direction within the corresponding hole with a ratchet mechanism to prevent movement of the ratcheting button in a second direction opposite the first direction within the corresponding hole; and
push against the backside of the upper body portion of the laptop that is secured between the left and right braces of the left and right arms, when moved in the first direction within the corresponding hole.

13. An apparatus for physically securing a laptop in an open position to a display surface, wherein the laptop includes a lower body portion including a keyboard and an upper body portion including a display screen and attached to the lower body portion by a hinge, the apparatus comprising:

a main body;
one or more fasteners extending downward from the main body and configured to secure the main body to the display surface;
left and right arms that are extendable and retractable relative to the main body, the left and right arms comprising, respectively, left and right braces configured to engage left and right sides of the upper body portion of the laptop;
a rotatable gear including first engagement features extending from an outer circumference of the rotatable gear, and also including second engagement features extending from a side of the rotatable gear; and
a gear stop including third engagement features facing the second engagement features of the rotatable gear;
wherein the first engagement features of the rotatable gear engage rack gears of the left and right arms to provide for extension and retraction of the left and right arms in tandem relative to the main body;
wherein the gear stop has a first position and a second position;
wherein when the gear stop is in the first position, the third engagement features of the gear stop are biased against the second engagement features of the rotatable gear, during which the apparatus is in a unidirectional configuration that allows for rotation of the rotatable gear in a first direction that allows for the retraction of the left and right arms in tandem relative to the main body, and during which the rotatable gear is prevented from being rotated in a second direction that prevents the extension of the left and right arms; and
wherein when the gear stop is in a second position, the third engagement features of the gear stop are moved away from the second engagement features of the rotatable gear, during which the apparatus is in a bidirectional configuration that allows for rotation of the rotatable gear in both of the first and second directions, thereby allowing for the extension of the left and right arms.

14. The apparatus of claim 13, further comprising:
a tab configured to transition the apparatus from the unidirectional configuration to the bidirectional configuration in response to the tab being pressed.

15. The apparatus of claim 14, wherein:
the tab is part of a lever that is configured to overcome the bias of a spring and move the gear stop from the first position to the second position in response to the tab being pressed.

16. The apparatus of claim 15, wherein that tab:
extends through an opening in a bottom of the main body; and
is inaccessible, except from an underside of the display surface, when the apparatus is attached to the display surface.

17. The apparatus of claim 13, further comprising:
one or more ratcheting buttons configured to push against a backside of the upper body portion of the laptop that is secured between the left and right braces of the left and right arms so that the apparatus can accommodate various different thicknesses that the upper body portion of the laptop may have;
wherein each ratcheting button, of the one or more ratcheting buttons, is located in a corresponding hole in the main body or in one of the left and right arms; and
wherein each ratcheting button, of the one or more ratcheting buttons, is movable in a first direction within the corresponding hole with a ratchet mechanism to prevent movement of the ratcheting button in a second direction opposite the first direction within the corresponding hole.

18. An apparatus for physically securing a laptop in an open position to a display surface, wherein the laptop includes a lower body portion including a keyboard and an upper body portion including a display screen and attached to the lower body portion by a hinge, the apparatus comprising:
a main housing;
a base from which one or more fasteners extend downward;
a pedestal that supports the main housing above the base;
left and right arms that are extendable and retractable relative to the main housing, the left and right arms comprising, respectively, left and right braces; and
a tab configured to transition the apparatus from a unidirectional configuration to a bidirectional configuration in response to the tab being pressed;
wherein when the apparatus is in the unidirectional configuration the left and right arms are retractable in tandem relative to the main body, and the left and right arms are prevented from being extended relative to the main body;
wherein when the apparatus is in the bidirectional configuration the left and right arms are both retractable and extendable relative to the main body; and
wherein the apparatus is normally in the unidirectional configuration when the tab is not pressed, the apparatus transitions from the unidirectional configuration to the bidirectional configuration in response to the tab being pressed, and the apparatus returns to the unidirectional configuration when the tab is no longer being pressed.

19. The apparatus of claim 18, wherein:
the tab extends through an opening in a bottom of the base, extends below the display surface, and is inaccessible from above the display surface when the apparatus is secured to the display surface by the one or more fasteners.

20. The apparatus of claim 18, further comprising:
one or more ratcheting buttons configured to push against a backside of the upper body portion of the laptop that is secured between the left and right braces of the left and right arms so that the apparatus can accommodate various different thicknesses that the upper body portion of the laptop may have;
wherein each ratcheting button, of the one or more ratcheting buttons, is located in a corresponding hole in the main body or in one of the left and right arms; and
wherein each ratcheting button, of the one or more ratcheting buttons, is movable in a first direction within the corresponding hole with a ratchet mechanism to prevent movement of the ratcheting button in a second direction opposite the first direction within the corresponding hole.

21. An apparatus for physically securing a laptop in an open position to a display surface, wherein the laptop includes a lower body portion including a keyboard and an upper body portion including a display screen and attached to the lower body portion by a hinge, the apparatus comprising:
a main body;
one or more fasteners extending downward from the main body and configured to secure the main body to the display surface;
left and right arms including, respectively, left and right braces configured to engage left and right sides of the laptop so that the apparatus can accommodate various different widths that the laptop may have;
a rotatable gear including first engagement features extending from an outer circumference of the rotatable gear, and also including second engagement features extending from a side of the rotatable gear;
a gear stop including third engagement features facing the second engagement features of the rotatable gear;
wherein the first engagement features of the rotatable gear engage portions of the left and right arms to provide for extension and retraction of the left and right arms in tandem relative to the main body;
wherein the gear stop has first and second positions;
wherein when the gear stop is in the first position the third engagement features of the gear stop are against the second engagement features of the rotatable gear, during which the rotatable gear is rotatable in a first rotational direction that allows for retraction of the left and right arms in tandem relative to the main body, and during which the rotatable gear is prevented from being rotated in a second direction rotational direction that is opposite the first rotational direction thereby preventing the extension of the left and right arms; and
wherein when the gear stop is in the second position the third engagement features of the gear stop are not against the second engagement features of the rotatable gear, during which the rotatable gear is rotatable in both of the first and second rotational directions, thereby allowing for the extension of the left and right arms in tandem.

22. The apparatus of claim 21, wherein:
the gear stop is normally biased in one of the first and second positions; and
the gear stop is movable from the one of the first and second positions to the other one of the first and second positions by overcoming the bias.

23. The apparatus of claim 21, further comprising:
a spring configured to normally bias the gear stop in one of the first and second positions.

24. The apparatus of claim 23, wherein:
the gear stop is movable from the one of the first and second positions to the other one of the first and second positions by overcoming the bias of the spring.

\* \* \* \* \*